(12) United States Patent
Gao et al.

(10) Patent No.: US 8,386,593 B1
(45) Date of Patent: Feb. 26, 2013

(54) COMPUTER AIDED NETWORK ENGINEERING SYSTEM, APPARATUS, AND METHOD

(75) Inventors: Lingping Gao, Lexington, MA (US); Guangdong Liao, Mississauga (CA)

(73) Assignee: NetBrain Technologies Inc., Burlington, MA (US)

( * ) Notice: Subject to any disclaimer, the term of this patent is extended or adjusted under 35 U.S.C. 154(b) by 643 days.

(21) Appl. No.: 12/505,432

(22) Filed: Jul. 17, 2009

Related U.S. Application Data

(60) Provisional application No. 61/081,624, filed on Jul. 17, 2008, provisional application No. 61/081,652, filed on Jul. 17, 2008.

(51) Int. Cl.
G06F 15/173 (2006.01)
G06F 3/00 (2006.01)

(52) U.S. Cl. ............... 709/223; 709/224; 710/8; 710/15; 715/761

(58) Field of Classification Search .................. 709/206; 710/8, 15; 715/761
See application file for complete search history.

(56) References Cited

U.S. PATENT DOCUMENTS

| | | | | |
|---|---|---|---|---|
| 5,276,789 A | | 1/1994 | Besaw et al. ................ | 395/140 |
| 5,504,921 A | | 4/1996 | Dev et al. ..................... | 395/800 |
| 5,572,640 A | | 11/1996 | Schettler ..................... | 395/140 |
| 6,058,103 A | | 5/2000 | Henderson et al. .......... | 370/254 |
| 6,137,782 A | | 10/2000 | Sharon et al. ............... | 370/254 |
| 6,151,031 A | | 11/2000 | Atkins et al. ................ | 345/441 |
| 6,205,122 B1 | | 3/2001 | Sharon et al. ............... | 370/254 |
| 6,253,240 B1 | * | 6/2001 | Axberg et al. ............... | 709/223 |
| 6,289,380 B1 | * | 9/2001 | Battat et al. ................. | 709/224 |
| 6,477,572 B1 | | 11/2002 | Elderton et al. ............. | 709/224 |
| 6,628,304 B2 | | 9/2003 | Mitchell et al. ............. | 345/734 |
| 6,718,382 B1 | | 4/2004 | Li et al. ....................... | 709/224 |
| 6,907,572 B2 | | 6/2005 | Little et al. .................. | 715/762 |
| 6,957,263 B2 | | 10/2005 | Galou et al. ................. | 709/227 |
| 7,054,901 B2 | | 5/2006 | Shafer ......................... | 709/203 |
| 7,376,719 B1 | | 5/2008 | Shafer et al. ................ | 709/220 |
| 7,469,139 B2 | * | 12/2008 | van de Groenendaal ..... | 455/411 |
| 7,590,718 B2 | * | 9/2009 | Gilmour et al. ............. | 709/223 |
| 7,765,320 B2 | | 7/2010 | Vehse et al. ................. | 709/238 |
| 7,813,281 B2 | * | 10/2010 | Bolt et al. .................... | 370/231 |
| 7,823,069 B1 | | 10/2010 | Tanner et al. ................ | 715/745 |
| 7,996,415 B1 | | 8/2011 | Raffill et al. ................ | 707/758 |
| 2002/0161861 A1 | | 10/2002 | Greuel ........................ | 709/220 |
| 2002/0198974 A1 | | 12/2002 | Shafer ......................... | 709/223 |
| 2006/0015591 A1 | | 1/2006 | Datla et al. .................. | 709/230 |
| 2007/0058570 A1 | * | 3/2007 | Singh et al. ................. | 370/254 |
| 2008/0120129 A1 | * | 5/2008 | Seubert et al. .............. | 705/1 |
| 2008/0155423 A1 | | 6/2008 | Moran et al. ................ | 715/736 |
| 2009/0094521 A1 | | 4/2009 | Hung et al. .................. | 715/736 |
| 2010/0023867 A1 | | 1/2010 | Coldiron et al. ............. | 715/736 |
| 2010/0122175 A1 | | 5/2010 | Gupta et al. ................. | 715/735 |

OTHER PUBLICATIONS

United States Patent and Trademark Office, Office Action, dated Mar. 20, 2012, U.S. Appl. No. 12/510,467, 13 pages.
Cisco Systems, Inc., "Show Command Section Filter," Cisco IOS Release 12.3(2)T, 6 pages, 2003.

* cited by examiner

*Primary Examiner* — Asghar Bilgrami
(74) *Attorney, Agent, or Firm* — Sunstein Kann Murphy & Timbers LLP

(57) ABSTRACT

A computer aided network engineering (CANE) system provides an integrated network management platform that not only decodes a user's network but also provides an interactive environment, based on data-driven maps, to allow users to define and automate network tasks. Among other things, the CANE system allows users to drive automation via self-contained interactive model-driven maps (referred to as Q-maps). Some of the tasks that can be automated include, without limitation: a) network diagramming and documentation; b) performance troubleshooting; and c) design analysis.

15 Claims, 24 Drawing Sheets

COMPUTER AIDED NETWORK ENGINEERING SYSTEM, APPARATUS, AND METHOD

CROSS-REFERENCE TO RELATED APPLICATION(S)

This patent application claims the benefit of U.S. Provisional Patent Application No. 61/081,624 entitled NETWORK MANAGEMENT SYSTEM AND METHOD filed on Jul. 17, 2008 and also claims the benefit of U.S. Provisional Patent Application No. 61/081,652 entitled NETWORK MANAGEMENT SYSTEM AND METHOD filed on Jul. 17, 2008, each of which is hereby incorporated herein by reference in its entirety.

FIELD OF THE INVENTION

The present invention relates generally to communication network management systems and, more particularly, to computer aided network engineering that uses model-driven topology map to drive network automation.

BACKGROUND OF THE INVENTION

In modern computer age, business relies on network to function properly. According to some estimates, network outrages cost $1,400 per minute on average. How to reduce down time is critical to the success of business. However, network is getting more and more complex and it is increasingly difficult to manage it efficiently with traditional methods and tools. The following are some of the key challenges in network management facing nearly 2 million network professionals in large enterprises:

The text-based command-line interface (CLI) is still the primary method to carry out most network engineering tasks. Command line interface relies on human engineers typing in proper text command, and print to the screen the status or configuration of network. Human being needs a lot of training to decode the large volume of text to discover the network issues, and propose proper network design. It is very error-prone and inefficient.

The engineering tasks required of network professionals are very complex and dynamic in nature. Such tasks often include discovering and documenting network design, troubleshooting network faults, propose and implementing network changes. Each network tasks often needs hundreds of elementary steps, such as issuing a command inside command line interface. Network, even though the design of which is static, is dynamically reacting to any topology change or traffic flow change—making it very difficult for human engineer to analyze and troubleshoot.

For years, traditional network management solutions have been trying to solve the above challenges with automation. But those automations suffered from the effectiveness, in that they are centering on network, not on specific network tasks in hand. For example, it is possible for an engineer to run a change report across entire network, using traditional solutions. It is difficult to run a report of network change about a problem application, because neither the tools nor the human engineers can define the "the problem application" in a mutually understandable format, with existing solutions.

Consequently, traditional network management systems typically generate large volumes of information, and the network engineer needs to dig through the information to find useful information. The following are some exemplary U.S. patents relating to network management systems and network mapping. U.S. Pat. Nos. 6,058,103 and 5,504,921 relate generally to network object models. U.S. Pat. Nos. 6,205,122, 5,276,789, 6,477,572, 5,572,640, and 6,137,782 relate generally to automatic detection of network topology. U.S. Pat. No. 6,137,782 discloses the method to automatically analyze and display the physical connection of a traffic flow. U.S. Pat. No. 6,957,263 discloses a user interface for discovering a network connection between two end points. U.S. Pat. No. 6,151,031 discloses a map builder system. U.S. Pat. No. 6,718,382 relates generally to detection of "leaky" points in a network. U.S. Pat. No. 6,628,304 discloses a map-based graphical user interface that allows the user to select a network node and then zoom-in or zoom-out from the selected node as a centrally located node to view different levels of the network device hierarchy. Each of the above-referenced patent is hereby incorporated herein by reference in its entirety. Because such network management systems generally are not aware of users' workflow, such tools are irrelevant to most engineers' network engineering tasks. Industry expert estimates as little as 2% network management tasks are actually automated.

Lastly, the network management industry lacks good methods that can describe and document network engineering processes. Typically, network engineering tasks are manually described by text and diagrams. Generally speaking, the moment such documentation is created, it becomes obsolete because the network is changing. Therefore, network professionals are often unwilling to spend much time on such manually documented methods.

SUMMARY OF THE INVENTION

Embodiments of the present invention provide a map-based Computer Aided

Network Engineering (CANE) system from which a network profession can orchestrate various network management tasks. The CANE system allows the user to not only display network maps at different levels of granularity but also to configure the types of network device configuration information to be displayed at each level. Furthermore, the CANE system provides automated network diagnosis, analysis, configuration, modeling/simulation, and documentation at multiple network layers (e.g., layer 2 and layer 3).

In accordance with one aspect of the invention there is provided a computerized method of modeling a communication network. The method involves obtaining, via a network interface, configuration information from each of a plurality of network devices; generating an interactive map file specifying a plurality of network elements associated with the plurality of network devices and including the configuration information, the configuration information logically divided into a plurality of data layers; mapping each data layer to one of a plurality of display resolutions; receiving, via a graphical user interface, first user input specifying a first display resolution; selecting, based on the first display resolution and the mapping, a first set of network elements and a first set of configuration information from the interactive network map file; and providing, via the graphical user interface, a first screen including the first set of network elements and the first set of configuration information for display on a user terminal.

In accordance with another aspect of the invention there is provided a computer aided network engineering system including a graphical user interface; a network interface; and a network manager configured to automatically collect network device configuration information via the network interface and present via the graphical user interface interactive network maps at user-selectable display resolutions, wherein the network device configuration information is logically divided into a plurality of data layers, each data layer mapped to one of the user-selectable display resolutions, and wherein at each display resolution, the network manager presents network device configuration information for selected devices based on the mapping.

In various alternative embodiments, the configuration information may be obtained by transmitting command line interface (CLI) commands to the network devices. The interactive map file may be generated by specifying at least one network element for each network device; and specifying at least one network element for a physical or logical interconnection between network devices. Each data layer may be mapped to one of a plurality of display resolutions by configuring a display resolution for each data layer. The mapping may be included in the interactive map file or may be maintained by the user terminal. The mapping may specify a minimum display resolution for each of the data layers, in which case the first set of configuration information may include only configuration information associated with one or more data layers having a minimum display resolution less than or equal to the first display resolution. The interactive network map file may be a layer 3 or layer 2 interactive network map file.

Additionally or alternatively, the method may further involve receiving, via the graphical user interface, second user input specifying a second display resolution; electing, based on the second display resolution and the mapping, a second set of network elements and a second set of configuration information from the interactive network map file; and providing, via the graphical user interface, a second screen including the second set of network elements and the second set of configuration information for display on the user terminal. The second user input may include a zoom selection, e.g., manipulation of a tracking device, optionally while a predetermined key is pressed; dragging of a slide bar control; selection of a zoom up or down control; a zoom value selected from a menu of zoom selections; or a zoom value entered into a zoom field. The first screen may include a zoom control and the second user input may be made using the zoom control.

Additionally or alternatively, the method may further involve modifying the mapping; selecting, based on the first display resolution and the modified mapping, a second set of network elements and a second set of configuration information from the interactive network map file; and providing, via the graphical user interface, a second screen including the second set of network elements and the second set of configuration information for display on the user terminal.

In accordance with another aspect of the invention there is provided a method of generating an interactive network map. The method involves obtaining, via a network interface, configuration information from each of a plurality of network devices, the configuration information logically divided into a plurality of data layers; mapping each data layer to one of a plurality of display resolutions; and generating an interactive map file specifying a plurality of network elements associated with the plurality of network devices and including the configuration information and the mapping.

In accordance with another aspect of the invention there is provided a method of displaying an interactive network map. The method involves receiving an interactive map file specifying a plurality of network elements and including associated configuration information, the configuration information logically divided into a plurality of data layers; maintaining, in a storage device, a map that associates each data layer with one of a plurality of display resolutions; receiving, via a graphical user interface, first user input specifying a first display resolution; selecting, based on the first display resolution and the mapping, a first set of network elements and a first set of configuration information from the interactive network map file; and providing, via the graphical user interface, the first set of network elements and the first set of configuration information for display on a display device.

In accordance with another aspect of the invention there is provided a method of displaying an interactive network map. The method involves providing, via a graphical user interface, a screen including a depiction of a network model; receiving, via the graphical user interface, user input selecting a portion of the network model; selecting, based on the user input, a menu bar from among a plurality of menu bars; and providing, via the graphical user interface, an updated screen including the depiction of the network model and the selected menu bar.

In accordance with another aspect of the invention there is provided a computer aided network engineering system including a graphical user interface; a network interface; and a network manager configured to automatically generate, for a user-selected device group representing a set of network devices, an interactive network map including network device configuration information collected for the set of network devices via the network interface and to provide the interactive network map via the graphical user interface.

In various alternative embodiments, the device group may be automatically generated by the network manager (e.g., a group of interconnected devices, a group of devices belonging to a common routing process, or a group of MPLS devices) or may be user-defined. The interactive network map may be a layer 3 map or a layer 2 map. The network manager may be further configured to generate a revised interactive network map including at least one neighbor of the device group and to provide the revised interactive network map via the graphical user interface.

In accordance with another aspect of the invention there is provided a computer aided network management system including a graphical user interface; a network interface; and a network manager configured to present via the graphical user interface an interactive network map including network device configuration information collected for a set of network devices via the network interface and to automatically generate electronic documentation upon receipt of a user request received via the graphical user interface.

In various alternative embodiments, the electronic documentation may include a text file and/or a drawing file. The network manager may be configured to generate the electronic documentation at least in part from a user specification of the types information to be included in the electronic documentation. The user specification may be based on a template.

In accordance with another aspect of the invention there is provided a computer aided network management system including a graphical user interface; a network interface; and a network manager configured to present via the graphical user interface an interactive network map including network device configuration information collected for a set of network devices via the network interface and to maintain a plurality of benchmark copies of the network device configuration information collected from the live network devices over time so as to enable comparison of different benchmark copies.

In various alternative embodiments, the network device configuration information may be collected at predetermined time intervals, which may be user-configured.

In accordance with another aspect of the invention there is provided a computerized method of analyzing network operation. The method involves maintaining a first benchmark copy of network device configuration information obtained from a set of network devices; obtaining a second benchmark copy of the network device configuration information from the set of network devices; and comparing the first and second benchmark copies and highlighting differences between the copies via a graphical user interface.

In various alternative embodiments, the second benchmark copy may be obtained after detection of a network problem and/or after a change is made to the network.

In accordance with another aspect of the invention there is provided a collaborative network management system including a first network manager station and a second network manager station in communication with the first network manager station, wherein the first network manager station is configured to generate an interactive network map file and share the interactive network map file with the second network manager station.

In various alternative embodiments, the second network manager station may be in communication with the first network manager station via a communication network, and the first network manager station may share the interactive network map file with the second network manager station over the communication network. Additionally or alternatively, the first network manager station may be configured to store the interactive network map file in the data server and the second network manager station may be configured to retrieve the interactive network map file from the data server.

In accordance with another aspect of the invention there is provided a computerized method of modeling a communication network. The method involves presenting, via a graphical user interface, a screen including an interactive network map depicting a set of network elements and a set of user-selectable device groups; and receiving, via the graphical user interface, user selection of a device group and presenting via the graphical user interface a revised screen including the interactive network map with any network elements associated with the selected device group highlighted.

In accordance with another aspect of the invention there is provided a computerized method of modeling a communication network. The method involves presenting, via a graphical user interface, a screen including an interactive layer 3 network map depicting a set of network elements; and receiving, via the graphical user interface, user selection of a routing protocol from a set of routing protocols and presenting via the graphical user interface a revised screen including the interactive network map with any network elements associated with the selected routing protocol highlighted.

In accordance with another aspect of the invention there is provided a computerized method of troubleshooting a communication network. The method involves identifying a problem area within the communication network, the problem area including a set of network elements; automatically mapping the identified problem area; selectively obtaining network device configuration information associated with the network elements based on user inputs received via a graphical user interface; and comparing network device configuration information obtained over time in order to identify a network problem.

In accordance with another aspect of the invention there is provided a computerized method of troubleshooting a communication network. The method involves maintaining a user-defined network configuration information for a set of network elements; obtaining network device configuration information from the set of network elements; and comparing the network device configuration information with the user-defined network configuration information and highlighting discrepancies between the network device configuration information and the user-defined network configuration information via a graphical user interface.

Thus, embodiments of the present invention may include systems and methods in which data-driven maps allow users to define network tasks, drive automation of the tasks, and use the maps as collaborative media to exchange information and manage the network.

BRIEF DESCRIPTION OF THE DRAWINGS

The foregoing and advantages of the invention will be appreciated more fully from the following further description thereof with reference to the accompanying drawings wherein:

FIG. 14a shows a sample routing table comparison result, in accordance with an exemplary embodiment of the present invention;

FIG. 14b shows the routing table comparison result for one device, in accordance with an exemplary embodiment of the present invention;

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
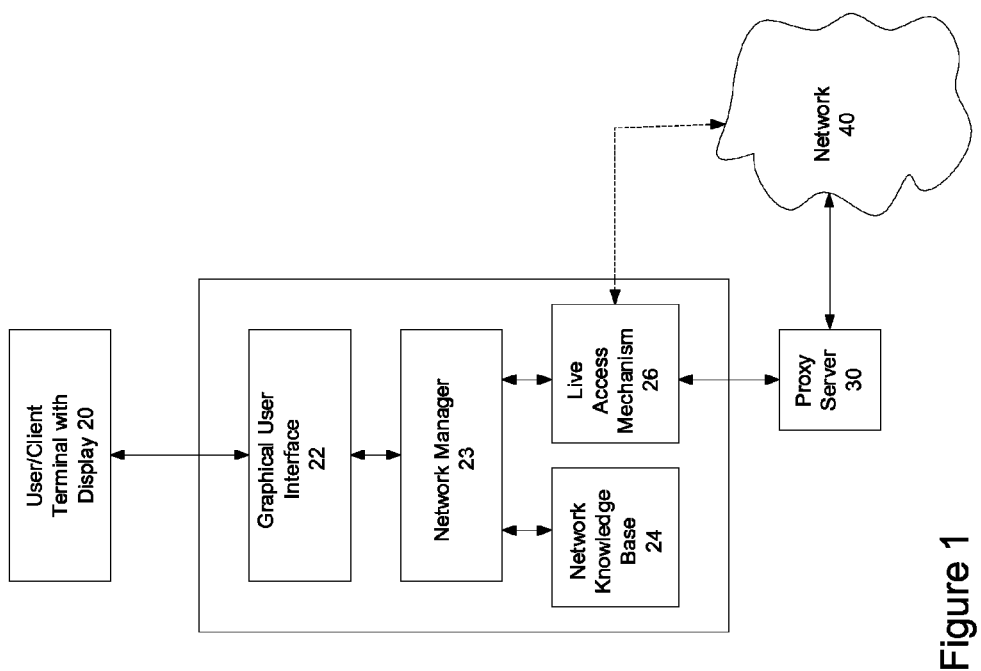
FIG. 1 is a schematic block diagram showing a network management system in accordance with an exemplary embodiment of the present invention.

Definitions. As used in this description and the accompanying claims, the following terms shall have the meanings indicated, unless the context otherwise requires:

A "set" includes one or more members.

A "storage device" is a device or system that is used to store data. A storage device may include one or more storage media such as, for example, magnetic or magneto-optical or optical disk drives, solid state storage devices, or magnetic tapes. A storage device may be locally or remotely accessed.

A "network element" is a physical or logical component associated with a network model. A typical network model includes various types of network elements such as, for example, various types of network devices (e.g., clients, servers, routers, switches, etc.) having various types of interfaces (e.g., ports, slots, etc.) and interconnected by various types of communication connections (e.g., serial links, LANs, WANs, VLANs, etc). Embodiments of the present invention utilize graphical (e.g., iconic) representations of network elements to depict physical and logical relationships within the network model at various levels (e.g., layer 2 or layer 3). The present invention is not limited to any particular type(s) of network elements.

A "configuration file" is collection of configuration data obtained from a network device. One example of a configuration file is the configuration data obtained from a network device running the Cisco IOS operating system in response to a "show run" command. Other types of network devices from other vendors may provide similar or different types of configuration files. The present invention is not limited to any particular type(s) of configuration files. Configuration files may be obtained from network devices, for example, using commands sent via the Simple Network Management Protocol (SNMP).

A "graphical user interface" or "GUI" is a user interface through which users interact with a computer system. Typically, a graphical user interface provides screens with at least some graphical representations that can be manipulated by the user, possibly along with text-based and other elements. A graphical user interface may be web-based.

In the context of a graphical user interface, a "window" or "panel" is an area of a user input screen in which information (e.g., icons, text, etc.) may be entered and/or displayed. A window may take up all or part of a display screen. A screen may have multiple windows.

Embodiments of the present invention provide an integrated network management platform that not only decodes a user's network but also provides an interactive environment, based on data-driven maps, to allow users to define and automate network tasks. For convenience, such a network management platform is referred to hereinafter as a computer aided network engineering (CANE) system. Among other things, the CANE system allows users to drive automation via a model-driven map (referred to hereinafter for convenience as Q-maps). Some of the tasks that can be automated include, without limitation: a) network diagramming and documentation; b) performance troubleshooting; and c) design analysis.

FIG. 1 is a schematic diagram showing relevant components of a network management system 10, in accordance with an exemplary embodiment of the present invention. Among other things, the network management system 10 includes a network manager 23 that communicates with a user/client terminal 20 via a graphical user interface 22 and via a network interface 26 (referred to hereinafter as the "live access mechanism") with various types of network devices in the live network 40 directly or more frequently via a proxy server 30. Information about the network devices is stored in a storage device 24 (referred to hereinafter as the "network knowledge base"). In typical embodiments, the network management system 10 is appliance-based and the graphical user interface 22 includes a Windows-based interactive user interface. The user/client terminal 20 may be directly connected to the network management system 10 or may communicate with the network management system 10 over a communication which may be the network 40 or may be a separate communication network (e.g., a wide area network).

As is known in the art, the network manager 23 includes the capability to obtain information from network devices (e.g., routers, switches, etc.) in the network 40, e.g., by issuing appropriate CLI commands or SNMP commands to the network devices either directly or via the proxy server 30 using conventional mechanisms known in the art. The network manager 23 may be prompted to obtain such information, for example, via user inputs received from the user/client terminal 20 via the graphical user interface 22. Additionally or alternatively, the network manager 23 may obtain such information as part of various automated processes. The network manager 23 may store the information in the network knowledge base 24 and/or may provide the information for display on the user/client terminal 20.

Unlike most network management systems, which present static network maps to the user/client terminal 20, embodiments of the present invention provide interactive network maps (i.e., Q-maps) to the user/client terminal 20. A Q-map is a self-contained network map file that includes information about the network, such as information about the network devices, interconnections between the network devices (which may be physical or logical interconnections, e.g., at layer 2 and/or layer 3), and other network knowledge such as, for example, routing protocols, multicast modes, Access List (ACL), and interface descriptions, to name just a few.

In essence, then, Q-maps define a common interface between human engineers and network management systems, such that first, complex network tasks can be described by human engineers graphically, and then the CANE system assists the human engineers by automating further activities.

Therefore, the Q-map is essentially a network management platform from which many network management tasks, which have traditionally been done by the network professional using the Command Line Interface (CLI), can be automated. The automated tasks include network diagramming and documentation, performance troubleshooting, and design analysis. For example, using Q-maps, one approach to troubleshooting a network problem involves three steps supported by underlying automation: 1) mapping the problem area, 2) probing the live network from the map to obtain current network information, and 3) comparing the current network information with historical information maintained for the network.

Furthermore, Q-maps provide an interactive platform through which the user can direct different network management operations. For example, the user can select one or more network devices displayed in a Q-map and perform various functions relating to the selected network device(s), such as, for example, displaying detailed information about the selected network device(s), obtaining configuration files from the selected network device(s), or testing the selected network device(s), to name but a few.

Q-maps can be created for an entire network, for a portion of a network, or for a group of network devices (referred to hereinafter as a "device group"). A device group is a group of devices with some common characteristics or relationship. In exemplary embodiments, some device groups are automatically created by the network manager, such as, for example, groups of devices connected to one another (e.g., island1, island2, etc.), groups of devices belonging to the same routing process (e.g., device group "#Eigrp 100 1 On Island 1" includes all devices having an interface running Eigrp 100 in island 1), and groups of MPLS devices. The user can also define device groups, such as, for example, a group of devices that are being managed by the user. The user can add devices to a group and/or remove devices from the group as desired. A list of device groups is maintained by the network manager, and the user can select a device group and perform various automated operations on the selected device group, such as, for example, creating a Q-map for the devices in the selected device group, extending a Q-map to include device group neighbors (e.g., if one device is connected to another one in a device group, the device is considered to be the neighbor of the device group), and highlighting devices associated with the device group in a map display.

Among other things, the interactive Q-maps can be manipulated at the file level (e.g., stored in the network knowledge base 24, transmitted to other network management systems, etc.) and can be selectively displayed by the user to different levels of granularity (i.e., zoom in/out), with different views containing different types and/or amounts of information. For example, a high-level view showing many network devices might include icons representing the various network devices and the interconnections between them with little ancillary information, while a detailed view might show an enlarged view of a subset of the network devices with additional information about the displayed network devices and/or interconnections. In a typical embodiment, many levels of granularity are supported, from a high-level view showing the network devices and related interconnections to a low-level view showing, for example, representations of the network interfaces and related information (e.g., IP addresses, protocols, etc.) for a single network device. Thus, the Q-map not only displays static network topology information including network devices and their connection but also displays network knowledge to a degree that is selectable by the user, allowing the user to toggle between different views.

Thus, the information in the Q-map is logically divided into data layers, and each data layer is associated with one of a plurality of display resolutions (i.e., zoom levels) representing different levels of granularity or resolution at which the Q-map may be viewed by the network professional. The mapping of data layers to display resolutions may be included in the Q-map and/or may be controlled by user/client terminal 20 or the network management system 10. The Q-map is used as a network management platform to automate many network management tasks, which is traditionally has been done by the network professional using the Command Line Interface (CLI) and Visio® maps. The automated tasks include network diagramming and documentation, performance troubleshooting, and design analysis. One systematic approach to troubleshoot a network problem involves mapping the problem area, probing the live network from the map to obtain current network information, and comparing the current network information with historical information maintained for the network.

Furthermore, Q-maps provide an interactive platform through which the user can direct different network management operations. For example, the user can select one or more network devices displayed in a Q-map and perform various functions relating to the selected network device(s), such as, for example, displaying detailed information about the selected network device(s), obtaining configuration files from the selected network device(s), or testing the selected network device(s), to name but a few.

In exemplary embodiments of the present invention, there are two types of Q-maps, namely Layer 3 (L3) Q-maps and Layer 2 (L2) Q-maps. An L3 Q-map is used to display the devices and their connections in network layer while an L2 Q-map shows the physical connections between network devices. In exemplary embodiments, L3 and L2 Q-maps contain different kinds of data, with L3 Q-maps including data related to the network layer (i.e., layer 3) and L2 Q-maps including data related to the data link layer (i.e., layer 2). These Q-maps are driven by the mathematical model for the whole network.

Figure 2A:
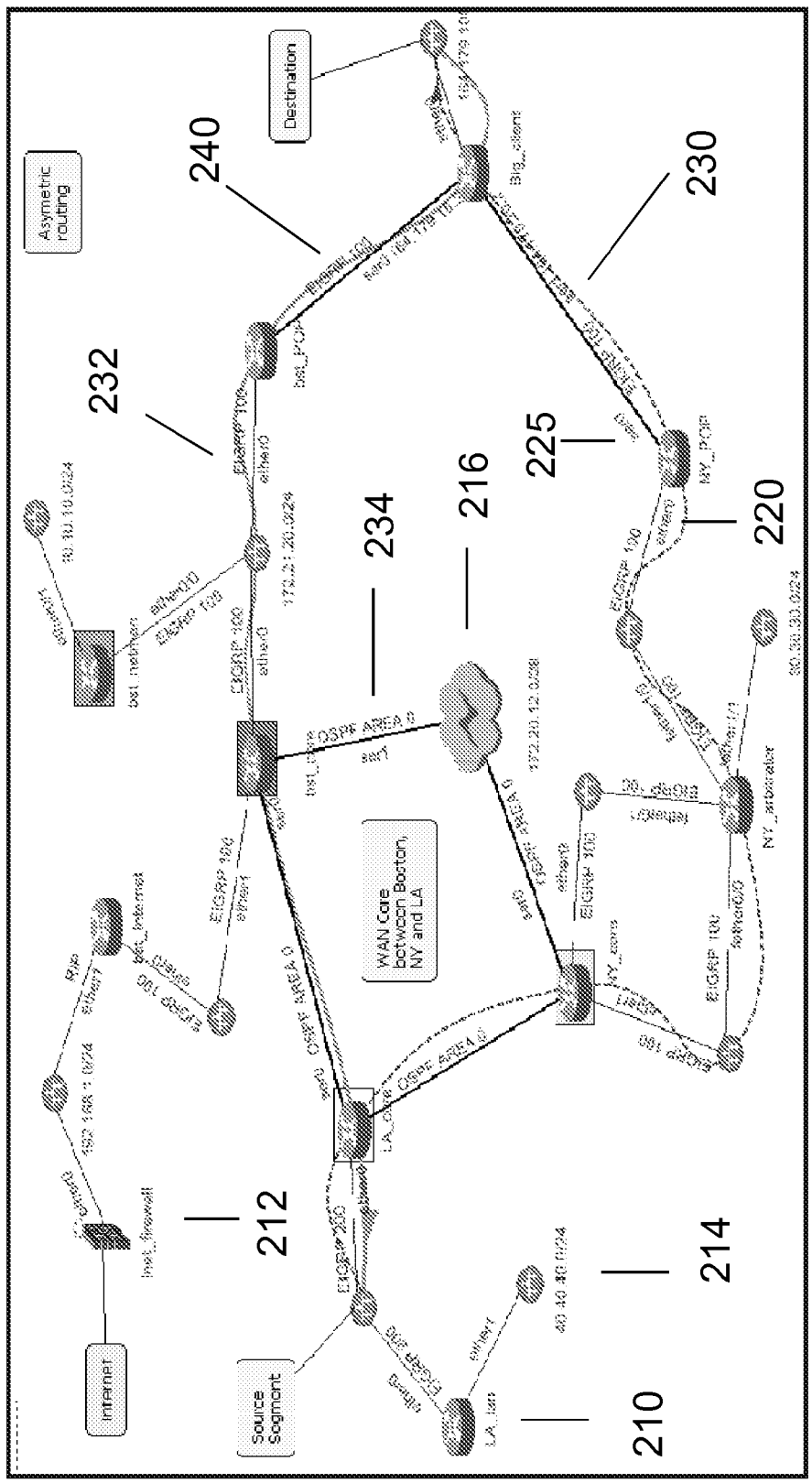
FIG. 2*a* shows a sample L3 Q-map, in accordance with an exemplary embodiment of the present invention.

FIG. 2a shows a sample L3 Q-map, in accordance with an exemplary embodiment of the present invention. The L3 Q-map is based on L3 device configuration files and includes the following data:

L3 devices such as router 210, Firewall 212, LAN segment 214, WAN 216, end host, etc. LAN segment 214 and WAN 216 are logical objects that are automatically created by the model and may or may not represent a physical object.

Network interfaces such as the Ethernet interface 220 and serial interface 225.

L3 connections between network devices such as links between two routers (e.g., link 230), links between a LAN and a router (e.g., link 232), and links between a WAN and a router (e.g., link 234).

Routing protocols (240), ACL, multicasting mode and other objects configured in the network device and network interfaces.

Figure 2B:
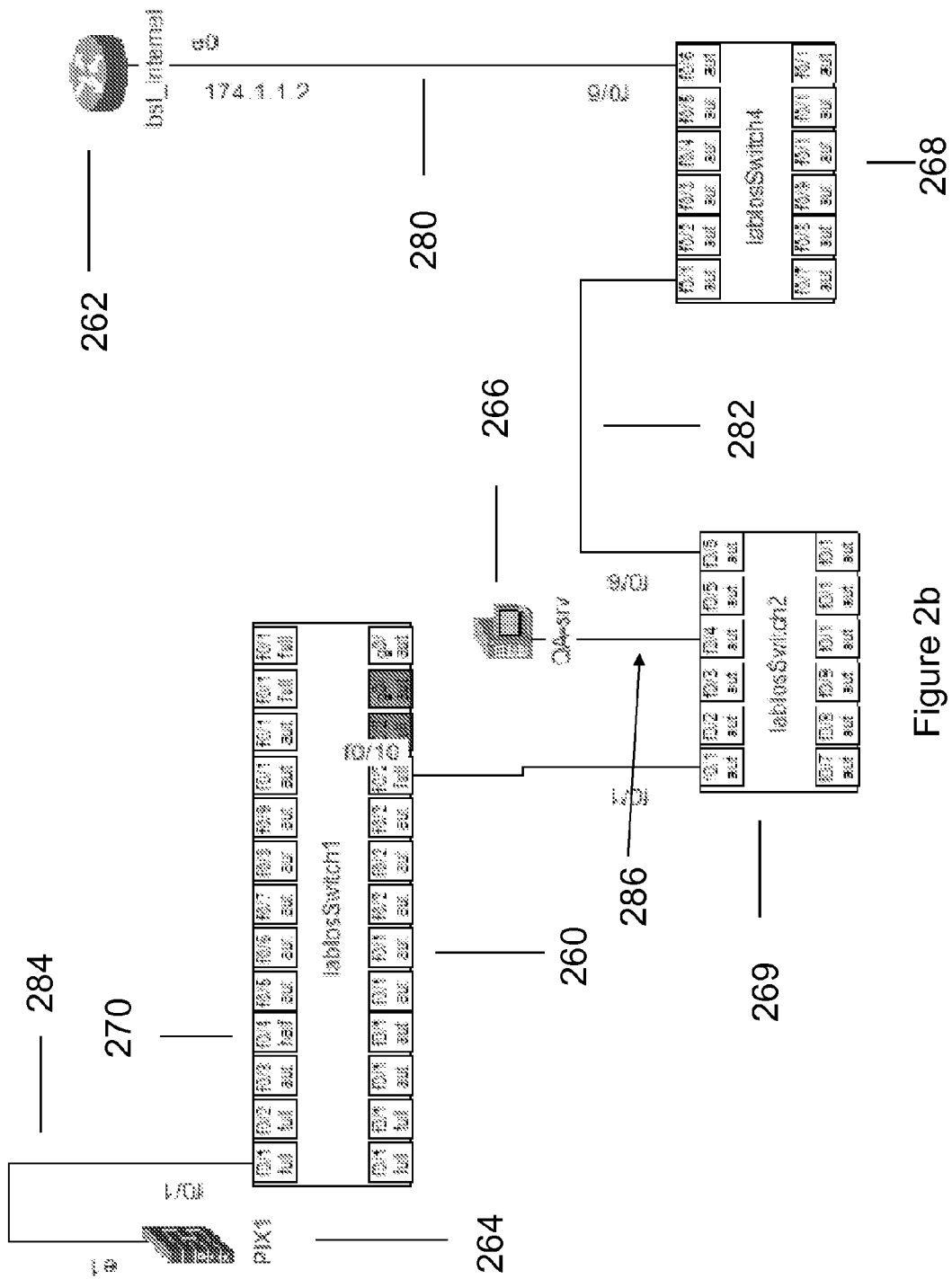
FIG. 2*b* shows a sample L2 Q-map, in accordance with an exemplary embodiment of the present invention.

FIG. 2b shows a sample L2 map, in accordance with an exemplary embodiment of the present invention. The model takes L2 device configurations and other types of data retrieved from the live network, such as CDP tables, ARP tables, and MAC tables as inputs to build the physical connections between network devices. The L2 Q-map displays the network devices, such as LAN switch 260, router 262, Firewall 264, end host 266 and other types of devices, switch port 270 and physical connections between them. In FIG. 2*b*, router 262 is connected to switch port f0/6 of switch 268 by the link 280; switch port f0/1 of switch 268 is connected to switch port f0/6 of switch 269 by the link 282; firewall 264 is linked to switch port f0/1 of switch 260 via link 284; and end host 266 is connected to port f0/4 of switch 269 by the link 286.

As discussed above, the Q-map is an interactive map. When the user zooms into the map to increase the map scale, more network configuration data are displayed, and when the user zooms out to decrease the map scale, less network configuration data are displayed. In order to display network configuration data dynamically, the network configuration data are divided into different layers. Data belonging to a particular data layer becomes visible when the zoom scale is greater than or equal to a predetermined zoom scale associated with that data layer. In exemplary embodiments of the present invention, the zoom scales for each data layer can be customized by the user as discuss in more detail below.

Figure 3:
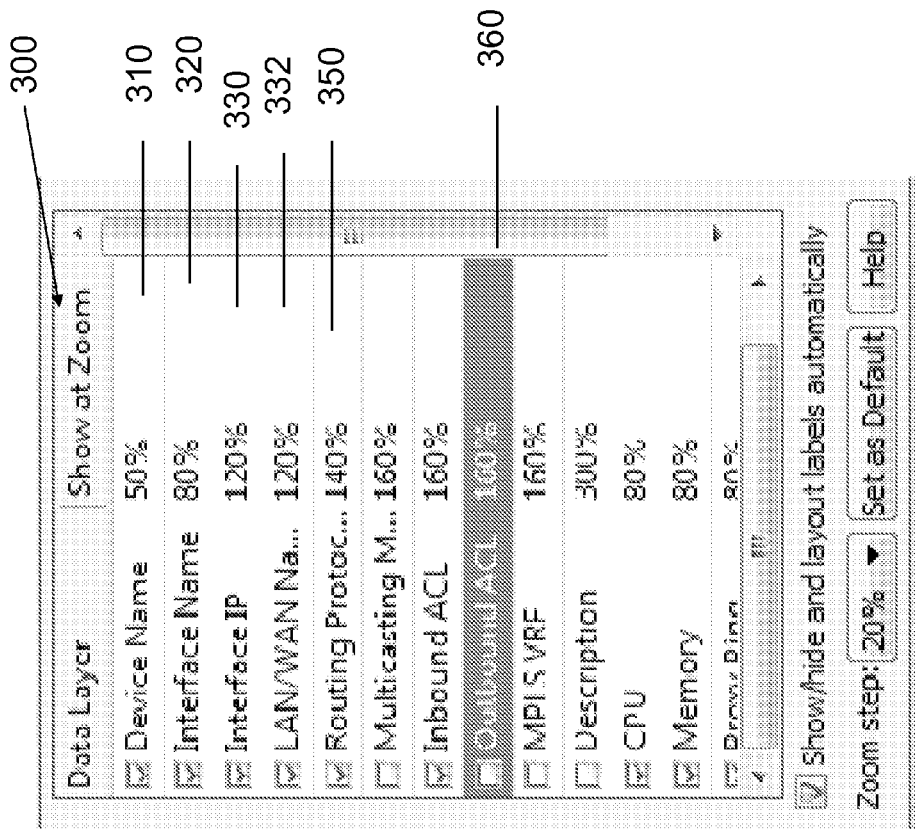
FIG. 3 shows a sample user interface for customizing the zoom scales for the data layers, in accordance with an exemplary embodiment of the present invention.

FIG. 3 shows a sample user interface for customizing the zoom scales for the data layers, in accordance with an exemplary embodiment of the present invention. Specifically, for each data layer, the user can customize whether or not the data layer is to be displayed (e.g., using the checkbox to the left of the data layer) and, for data layers that are to be displayed, the zoom scale 300 at which the data layer is displayed. For example, device name information 310 is visible if the zoom scale is equal to or larger than 50%, interface name information 320 is visible if zoom scale is equal or larger than 80%, interface IP information 330 and LAN/WAN name information 332 will be visible when zoom scale is equal or larger than 120%, routing protocol information 350 will be visible when zoom scale is equal or larger than 140%, and outbound ACL information 360 is set to be always invisible.

Figure 20:
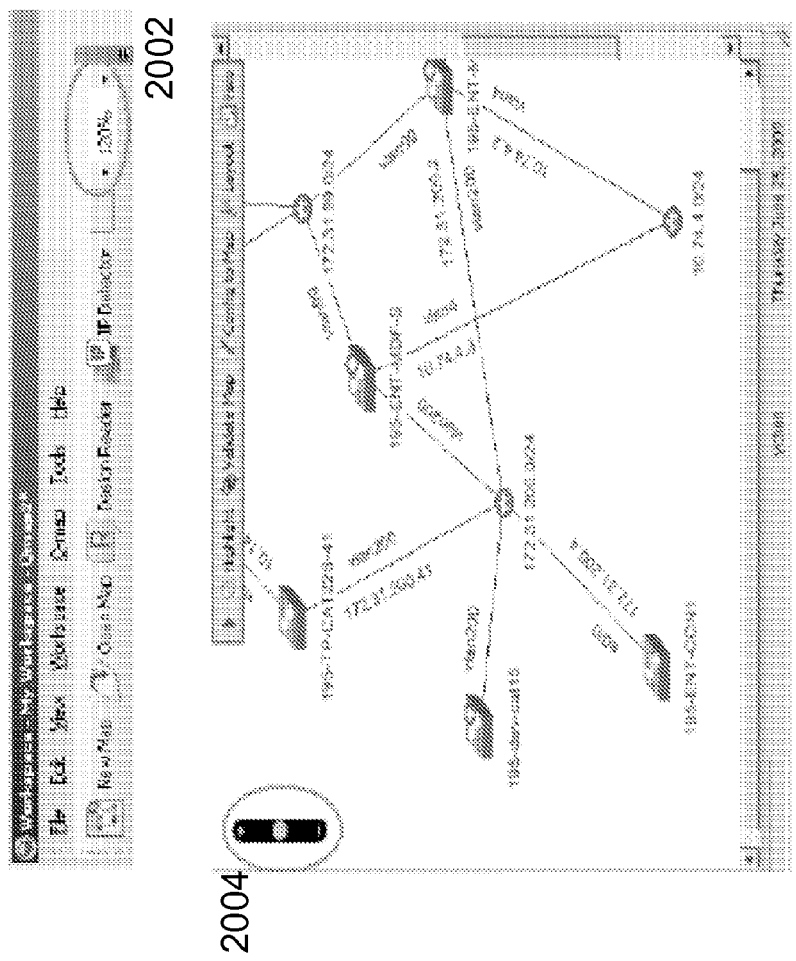
FIG. 20 shows sample zoom controls in accordance with an exemplary embodiment of the present invention.

Exemplary embodiments of the present invention may provide various types of zoom controls for controlling the zoom scale of the map display. FIG. 20 shows sample zoom controls in accordance with an exemplary embodiment of the present invention. Here, the zoom controls include a zoom field 2002 in the menu bar and a zoom control 2004 within the map window. The zoom field 2002 includes both a pull-down menu of zoom selections and a window in which the user can enter a zoom value. The zoom control 2004 includes a slide bar (i.e., the center circle) that the user can drag up and down to change the zoom scale as well as "+" and "−" controls for increasing and decreasing the zoom scale by a predetermined factor (e.g., in 20% increments).

Additionally, in exemplary embodiments of the invention, the zoom scale also can be controlled by the user through the hand-held input device (i.e., a "mouse" or similar input device), specifically by scrolling the tracking device (e.g., trackball, trackwheel, trackpad, etc.) to increase and decrease the zoom scale. In exemplary embodiments, the user can configure the zoom controls to require that a specific key (e.g., the CTRL key) be held down in order to manipulate the zoom scale using the tracking device.

Figure 4A:
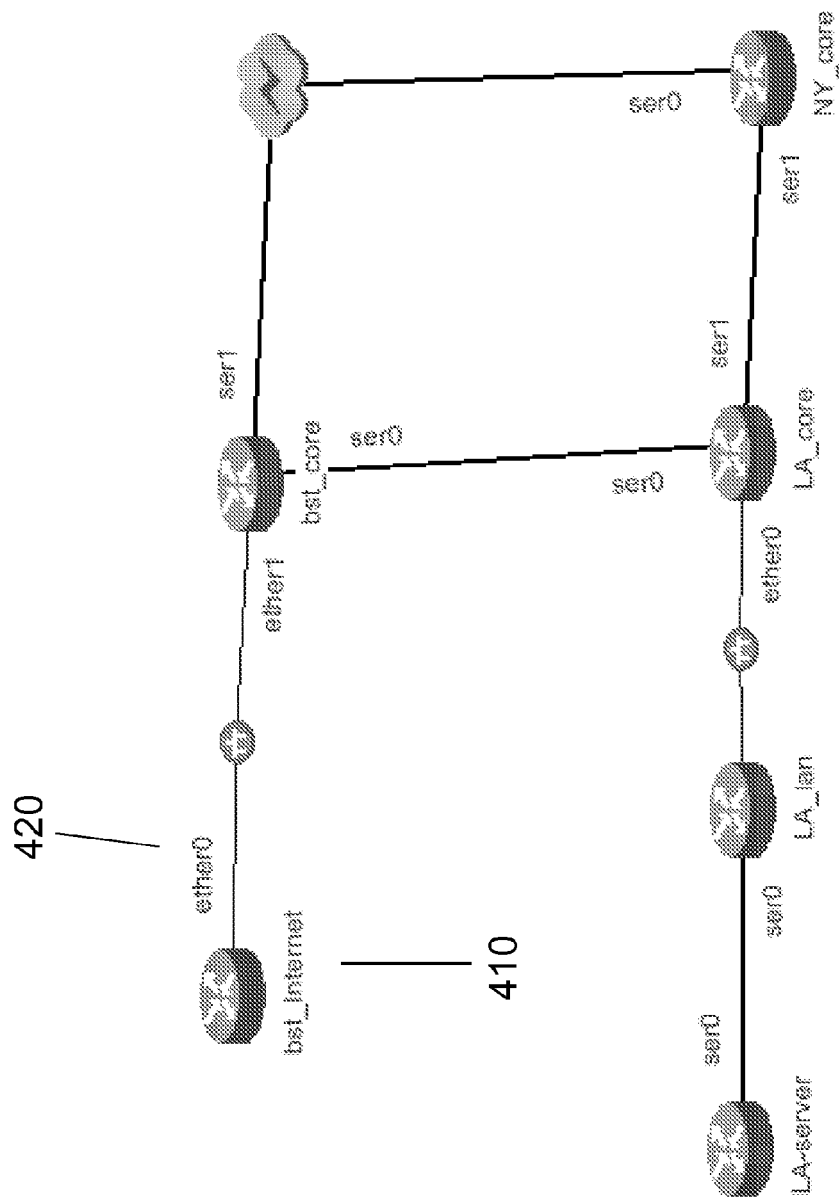
FIGS. 4*a*, 4*b*, and 4*c* show sample Q-map displays under zoom scales of 100%, 120%, and 160%, respectively, in accordance with an exemplary embodiment of the present invention.
Figure 4B:
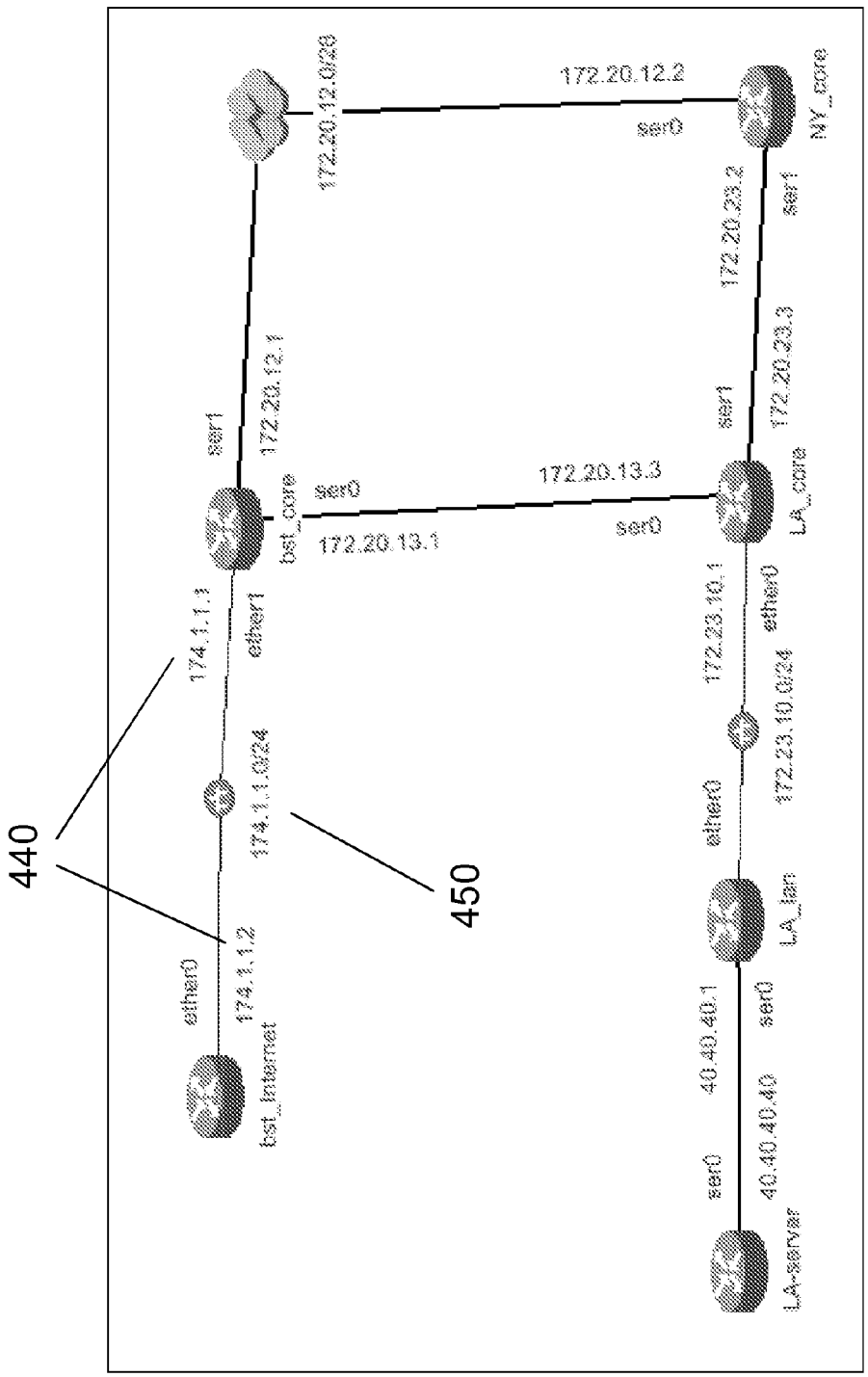
Figure 4C:
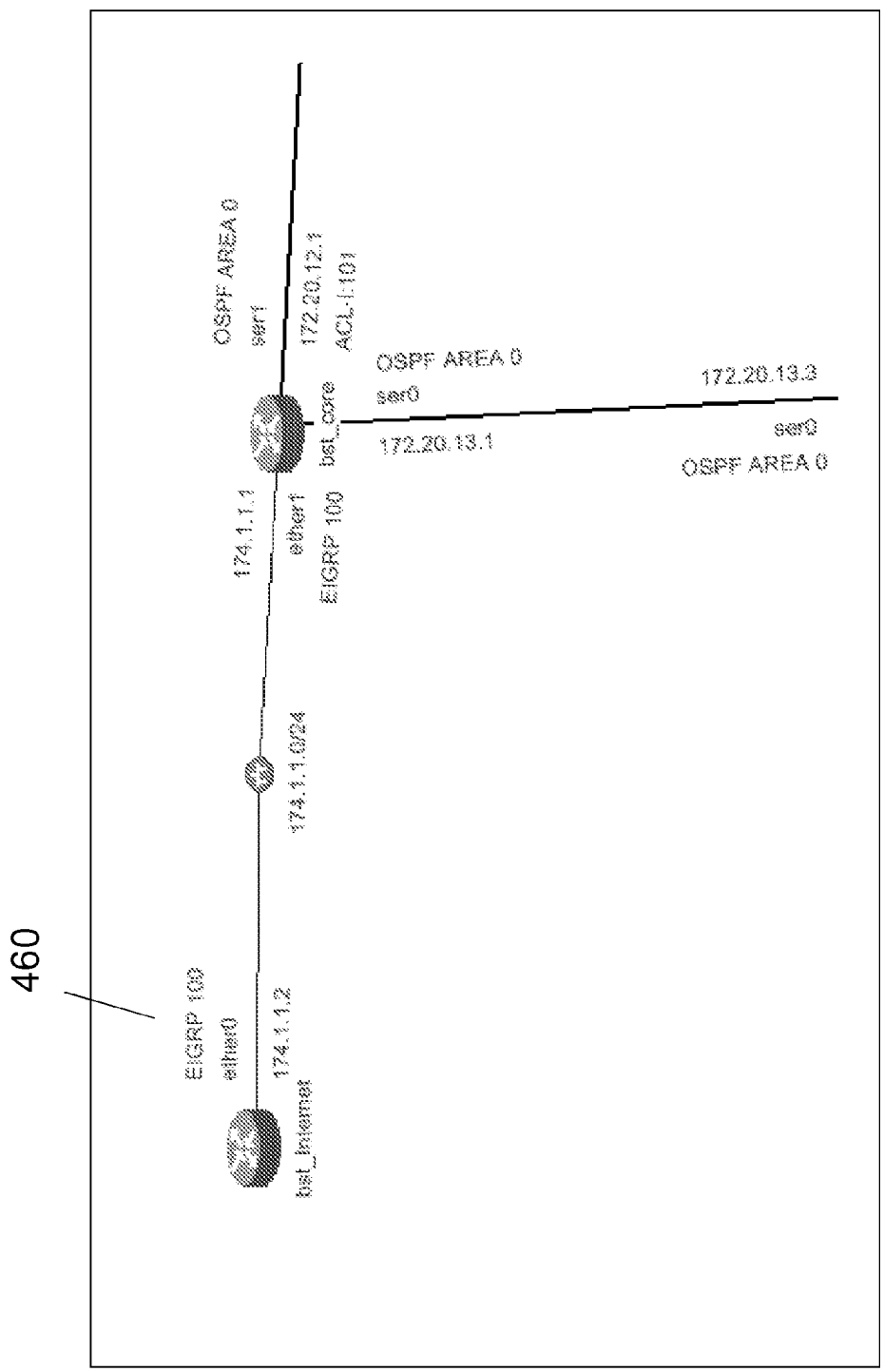

FIGS. 4*a*, 4*b*, and 4*c* show sample Q-map displays under different zoom scales indicated in FIG. 3, in accordance with an exemplary embodiment of the present invention. FIG. 4*a* shows a Q-map display with zoom scale at 100%. At this zoom scale, the device names associated with data layer 310 (e.g., 410) and interface names associated with data layer 320 (e.g., 420) are visible. FIG. 4*b* shows the Q-map display after the user changes the zoom scale from 100% to 120%. Here, interface IP addresses associated with data layer 330 (e.g., 440) and LAN names associated with data layer 332 (e.g., 450) become visible. FIG. 4*c* shows the Q-map display after the user changes the zoom scale from 120% to 160%. Here, routing protocol information associated with data layer 350 (e.g., 460) becomes visible.

The following is sample pseudocode for the zoom control in accordance with an exemplary embodiment of the present invention:

Receive zoom input;
If input=track up or zoom up ("+") then current_zoom+=INC;
If input=track down or zoom down ("−") then current_zoom−=INC;
If input=slide bar then current_zoom=slide bar position;
If input=selection from pulldown menu then current_zoom=selection;
If input=value entered in zoom window then current_zoom=value;
Select region of map to be displayed based on current_zoom;
For each network element in the selected region;
For each data layer
If data layer is visible and zoom scale <=current_zoom
Add data layer for the network element to region;
Endif
Endfor
Endfor
Display region with any added data layers
where "INC" is a predetermined zoom increment (e.g., 20%), which may be fixed or variable.

Figure 5:
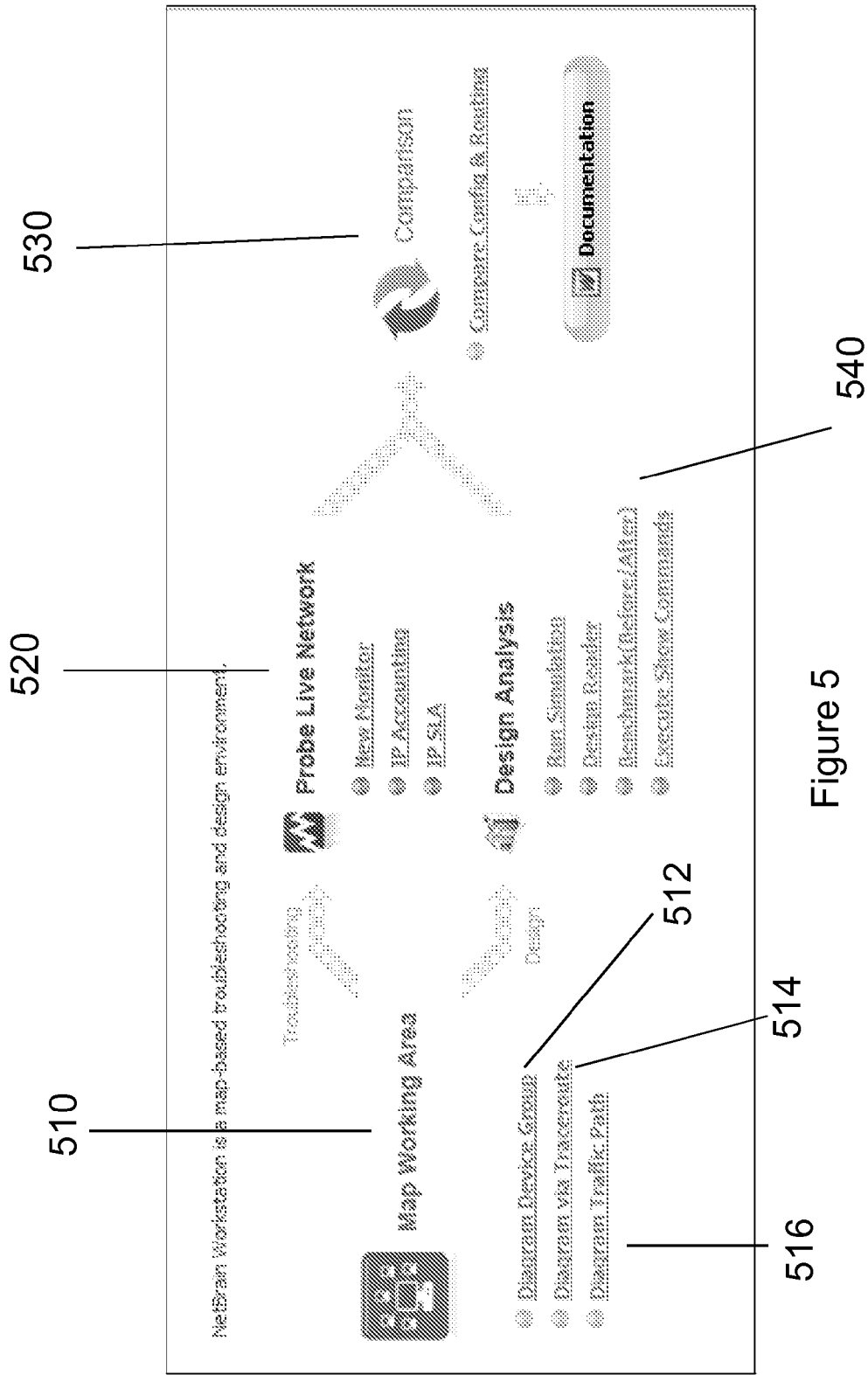
FIG. 5 shows a sample user interface screen from which the user can select various automated tasks, in accordance with an exemplary embodiment of the present invention.

As discussed above, the computer aided network engineering (CANE) system not only displays Q-maps but also automates various network engineering tasks using Q-maps. FIG. 5 shows a sample user interface screen from which the user can select various automated tasks, in accordance with an exemplary embodiment of the present invention. Through this user interface screen, users can perform mapping operations 510, probe the live network 520, perform design analysis 540, and compare configuration and configuration files 530, for example, to evaluate network problems and network designs. Compared with traditional CLI and paper or static diagrams, the CANE system provides a more intuitive and easier interface for network professionals to manage the network.

For example, the following is an exemplary automation process for troubleshooting a network problem, in accordance with an exemplary embodiment of the present invention:

1. Map the Problem Area Using Tools in the Map Working Area (510)

The system provides many ways for the user to automate creation of mapping according to the user's request, which in essence is defining the user's tasks with details so that the CANE system can continue from that point on. Automation of map creation also eliminates the need for paper diagrams. The system provides many ways to create the map automatically, corresponding to different real use cases (the details of these automations are discussed later):

1.1 Discover and create an L3 Q-map for the path between two end network devices (function 516 in FIG. 5). This automation is typically used when a connectivity issue or an application performance issue occurs.

1.2 Create an L2 Q-map for a Layer 2 path from a Layer 3 path.

1.3 Create an L3 Q-map for a device group (Function 512 in FIG. 5). This automation is typically used when the user works on a group of devices and is interested in the connections between devices in this group.

1.4 Create an L2 Q-map for a switch group. This automation can be used to create an L2 Q-map for a network site.

1.5 Create an L3 Q-map by extending a device neighbor. When a problem device is known, the user can create a topology around this device using this automation.

1.6 Create an L2 Q-map by extending a device neighbor.

1.7 Map the trace route result (Function 514 in FIG. 5). When an alarm of an unreachable device is received, the user can run trace route from the system and create the path for this trace route result.

2. Probe from the Map (520)

The system provides the automation to monitor all network objects in the Q-map and visually displays the network device status and performance data in real time. More details are discussed later.

3. Compare Configuration and Configuration Files (530)

The system provides the automation to benchmark the network data such as configuration, routing table, L2 and L3 topology for all devices in a Q-map. Further the system provides the automation to compare the historical data with the current data.

Figure 6:
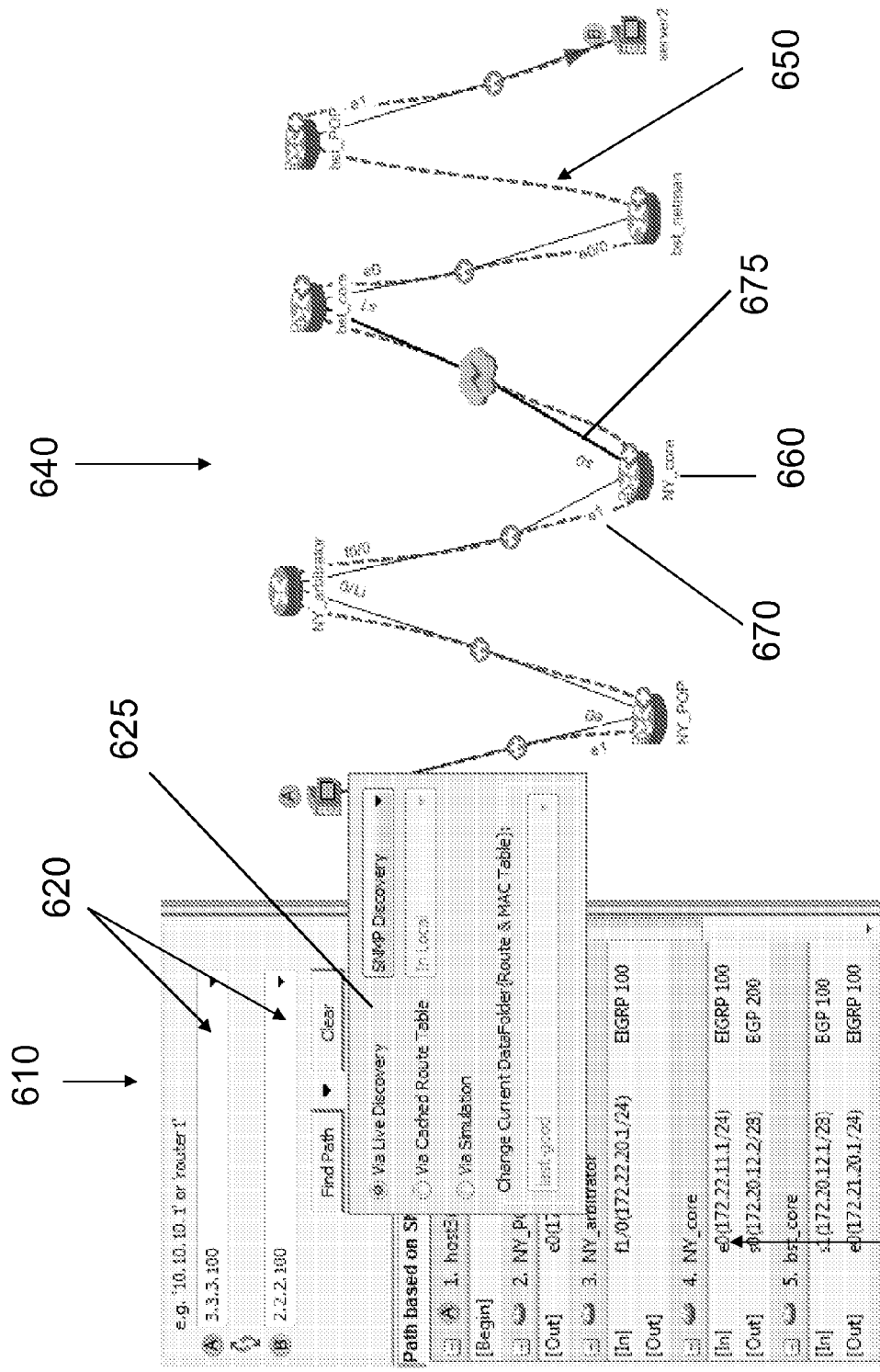
FIG. 6 shows a sample user interface to discover the path from the live network and create the Layer 3 Q-map for two end points, in accordance with an exemplary embodiment of the present invention.

FIG. 6 shows a sample user interface to discover the path from the live network and create the Layer 3 Q-map for two end points, in accordance with an exemplary embodiment of the present invention. Panel 610 controls the user input and panel 640 displays the result as a Q-map. The user can enter two end points, e.g., either IP address or a network device, at fields 620. On dropdown menu 625, the user can choose one of three ways to find the path:

Via live discovery. The user can select discover the path through the live network via SNMP, routing table or trace route. The result is the traffic path for the current network state.

Via cached routing table. The result is the traffic path calculated from the cached data and so presents the old traffic path.

Via simulation. The system uses the simulated results to calculate the path and the result presents the traffic path in the ideal state.

The discovered path is described hop by hop in field 630. For each hop, the device name, input and output interface are found and displayed. The Q-map corresponding to this result is drawn at panel 640. The curve 650 goes through each hop along the path. Again for each hop, the device, input interface and output interface are displayed in the map, for example, device 660 (NY_core), input interface 670 (e1) and output interface 675 (s0).

Using the interface illustrated in FIG. 6, the system automates the traffic path discovery and map creation for the path. Without the automation, it can take a long time for the network profession to discover the path between two end point (e.g., half an hour). With the automation, it generally takes a few seconds. This is but one example of how the CANE system can help increase productivity.

As discussed above, the system can automate the creation of an L2 path from an L3 path. The L2 path adds the physical connections for the L3 path, specifically by looking up the switch port associated with each input and output interface along the path and adding the switch and its port as a hop of the path. The calculation is based on the L2 model mentioned earlier.

Figure 7:
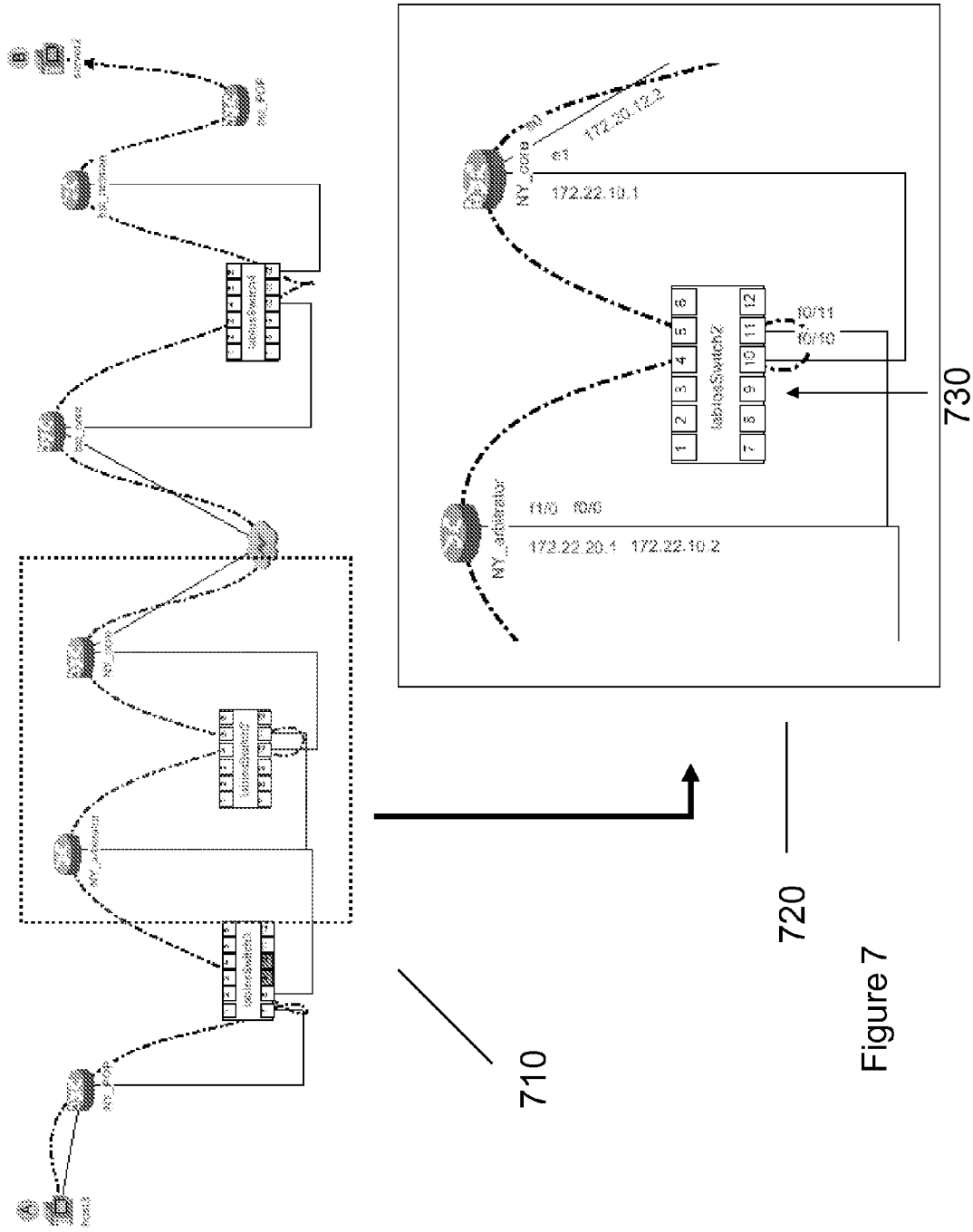
FIG. 7 shows a sample L2 path calculated from the L3 path illustrated in FIG. 6, in accordance with an exemplary embodiment of the present invention.

FIG. 7 shows a sample L2 path calculated from the L3 path illustrated in FIG. 6, in accordance with an exemplary embodiment of the present invention. Map 720 is a map of one part of the path with larger zoom scale. A new hop 730 is added between two consecutive hops in the original L3 path. The new hop includes a LAN switch, an input switch port f0/10 connected to router NY_core, and output switch port f0/11 connected to router NY_arbitrator, representing the physical connections of L3 path.

Figure 8A:
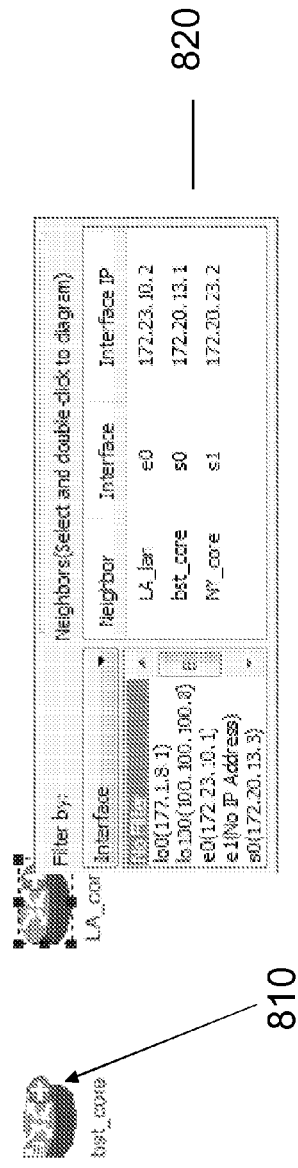
FIG. 8*a* shows a sample user interface for extending device neighbors, in accordance with an exemplary embodiment of the present invention.

FIG. 8*a* shows a sample user interface for extending device neighbors, in accordance with an exemplary embodiment of the present invention. When a device has neighbors not drawn in the Q-map, the system appends a red flag sign 810 at the top of device icon. Clicking this icon brings up the window 820. Inside this window, the user is provided the following ways to select which neighbors to be drawn in the Q-map:

No filter: extend all neighbors.

Interface: extend devices connected by the selected interface.

Routing neighbor: extend neighbor devices to run the same routing protocol as the selected one.

Multicasting neighbor: extend neighbor devices to run the same multicasting mode.

Device group: extend only devices in the selected device group. The device group includes all devices sharing the same characteristic, for example, running the same routing protocol.

Figure 8B:
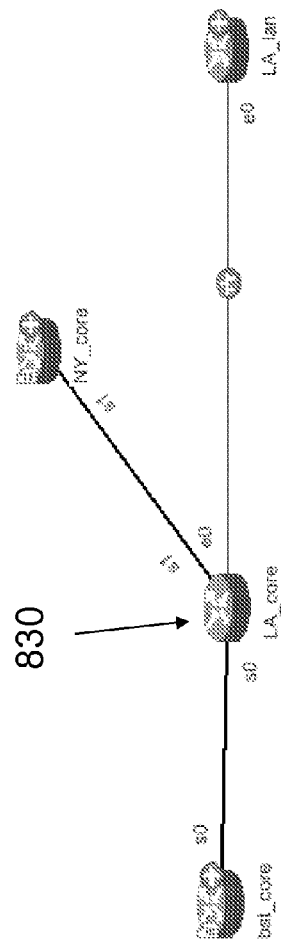
FIG. 8*b* shows a sample Q-map after the user selects extending all neighbors of device 830 in FIG. 8*a*, in accordance with an exemplary embodiment of the present invention.

FIG. 8*b* shows a sample Q-map after the user selects extending all neighbors of device 830 in FIG. 8*a*, in accordance with an exemplary embodiment of the present invention. Since all neighbors are visible in the Q-map, there is no red plus sign for this device.

Figure 9:
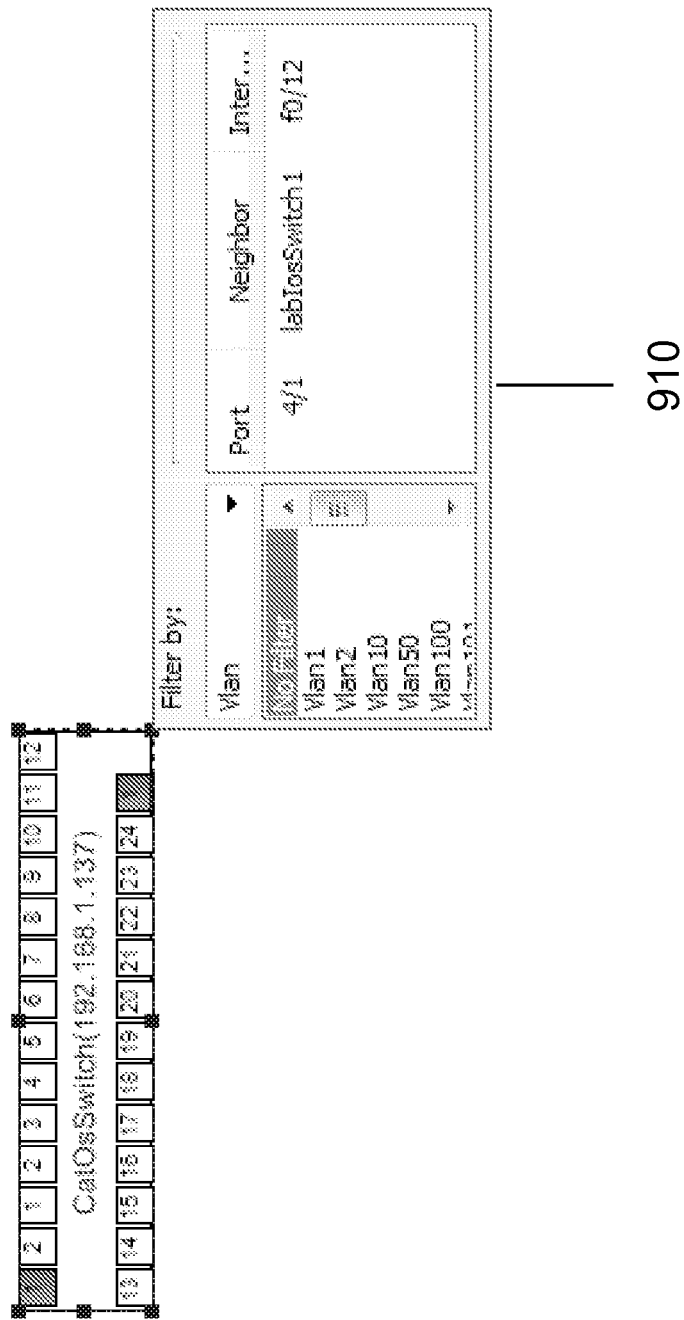
FIG. 9 shows a sample interface for extending an L2 switch neighbors, in accordance with an exemplary embodiment of the present invention.

Alternatively, an L2 Q-map may be created by extending the L2 neighbors. FIG. 9 shows a sample interface for extending an L2 switch neighbors, in accordance with an exemplary embodiment of the present invention. In the window 910, the user can select the following ways to select which neighbors to be drawn in the Q-map:

No filter: extend all neighbors.

Filter via VLAN: extend neighbor devices in the selected VLAN.

Filter via port: extend neighbor devices connected by the specific port

Filter via trunk: extend neighbor devices via the specific trunk.

Figure 10A:
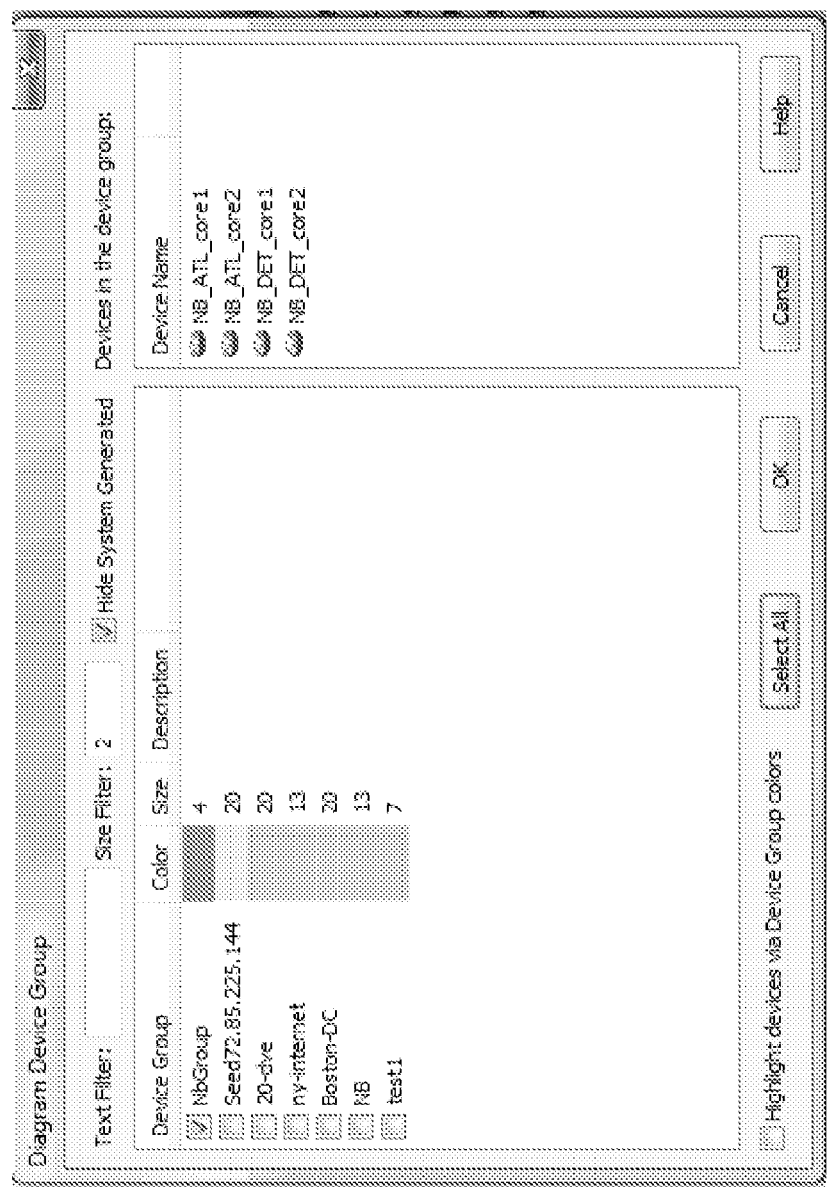
FIG. 10*a* shows a sample interface for creating a L3 Q-map via device group, in accordance with an exemplary embodiment of the present invention.
Figure 10B:
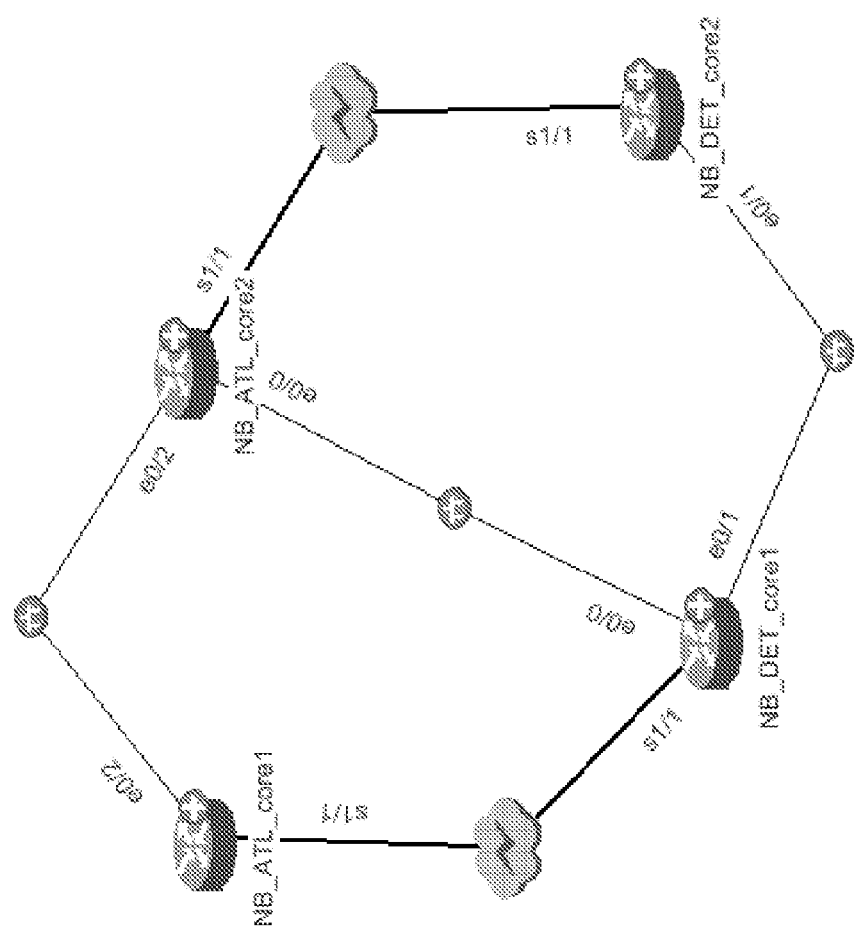
FIG. 10*b* shows a sample L3 Q-map created via a device group, in accordance with an exemplary embodiment of the present invention.

As mentioned above, exemplary embodiments allow Q-maps to be created for device groups. FIG. 10*a* shows a sample interface for creating a L3 Q-map via a device group, in accordance with an exemplary embodiment of the present invention. After the user selects a device group, the system automatically creates a Q-map to diagram all devices in this device group and all direct links among these devices based on the network model mentioned earlier. FIG. 10*b* shows a sample L3 Q-map created via a device group, in accordance with an exemplary embodiment of the present invention. This automation is powerful to help the user quickly create a topology for a network site of interest.

In a similar manner, the system also automates the creation of an L2 Q-map for a switch group. The automatically created L2 Q-map lays out all L2 switches and physical connections among these switches.

After a Q-map is created, it can be used as a visual operation system for network management. Starting from a Q-map, almost all routine network management tasks can be performed with full or partial automation.

Figure 11:
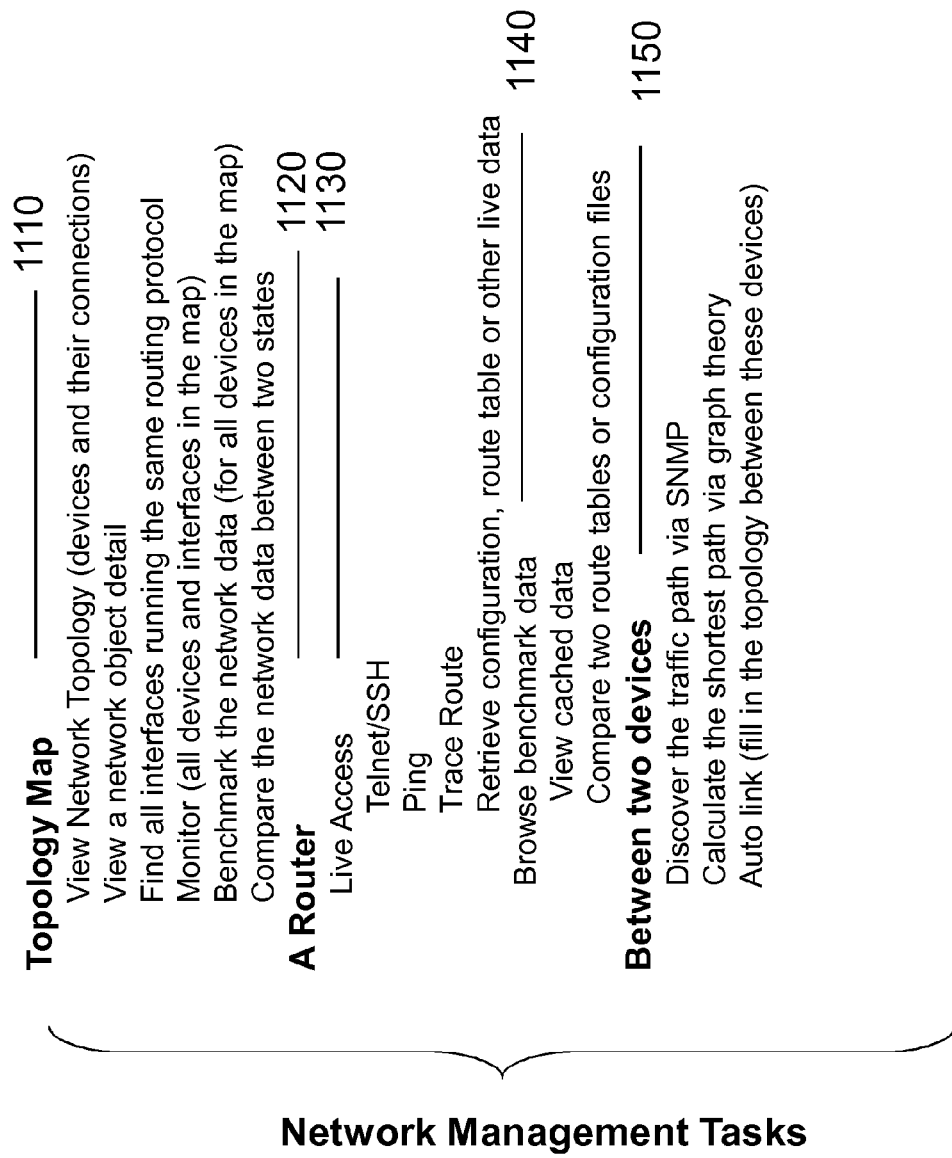
FIG. 11 lists some examples of frequently performed network tasks, in accordance with an exemplary embodiment of the present invention.

FIG. 11 lists some examples of frequently performed network tasks, in accordance with an exemplary embodiment of the present invention. The tasks are divided into three types according to the target of these tasks, namely tasks 1110 on the topology map or all network objects shown in the topology map, tasks 1120 on a router, and tasks 1130 between two network devices. Tasks 1120 can be further divided into two types of tasks, namely tasks 1130 to retrieve data from the live network and tasks 1140 to browse the benchmarked or cached data in the database. Without the automation of such tasks provided by the CANE system, these tasks normally would be performed via the CLI or other isolated tools, making it difficult to connect the results with the network topology. The Q-map is essentially a visual operation platform from which to accomplish these tasks.

In an exemplary embodiment of the present invention, a floating or quick menu bar is displayed along with the Q-map, for example, at the top of the Q-map. The menu context depends on the object being worked on by the user. For example, if the user clicks the blank space of the Q-map, the menu context of the floating bar displays all tasks applied to the Q-map (or all network objects in the Q-map). If the user clicks a network object on the Q-map such as a router, then the floating bar displays all tasks performed on this router. By automating all these tasks and displaying the result in the Q-map or in the result window, the system can help the user view the result visually and increase the productivity greatly.

Figure 12:
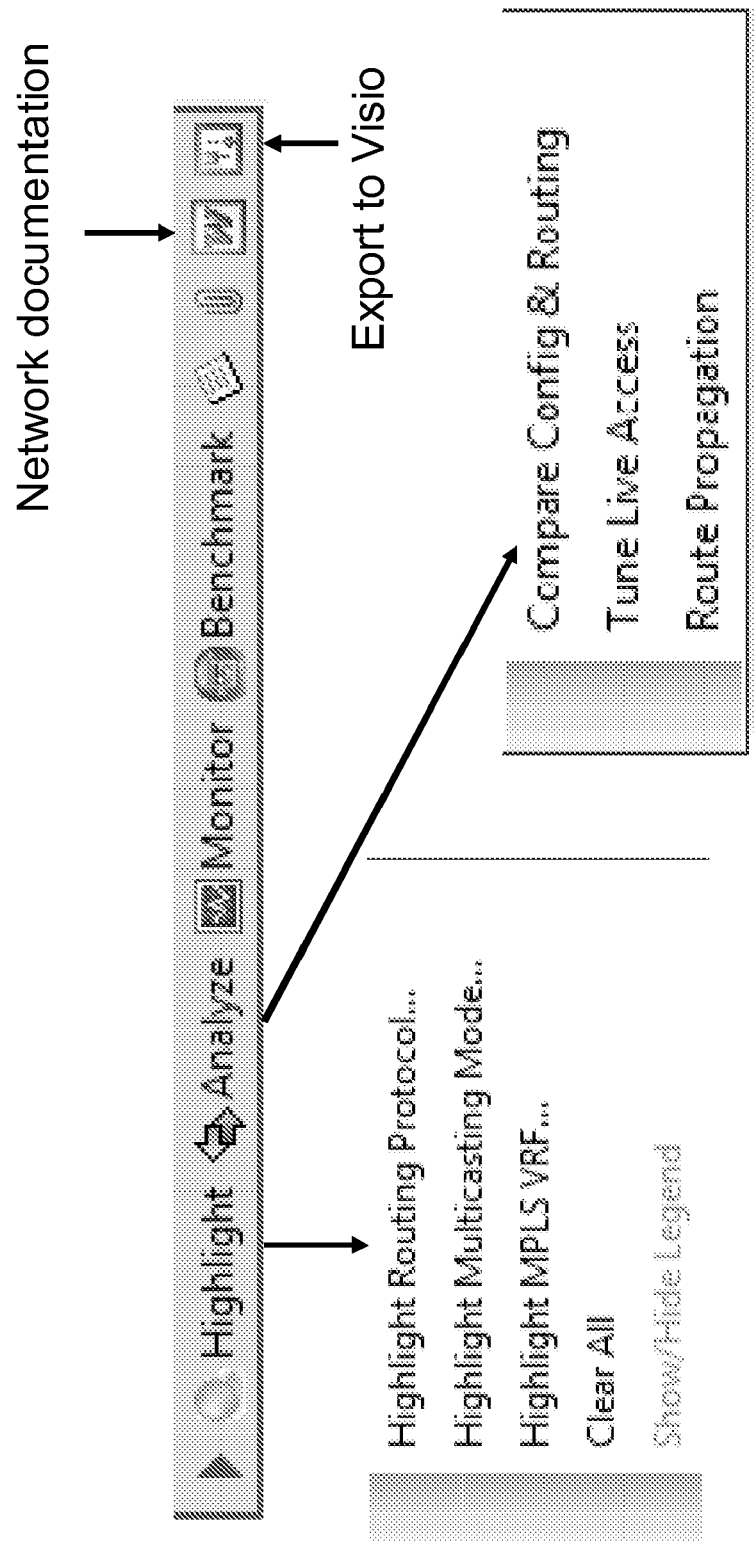
FIG. 12 shows a sample floating bar of the type displayed when the user clicks the blank space of a Q-map, in accordance with an exemplary embodiment of the present invention.
Figure 13:
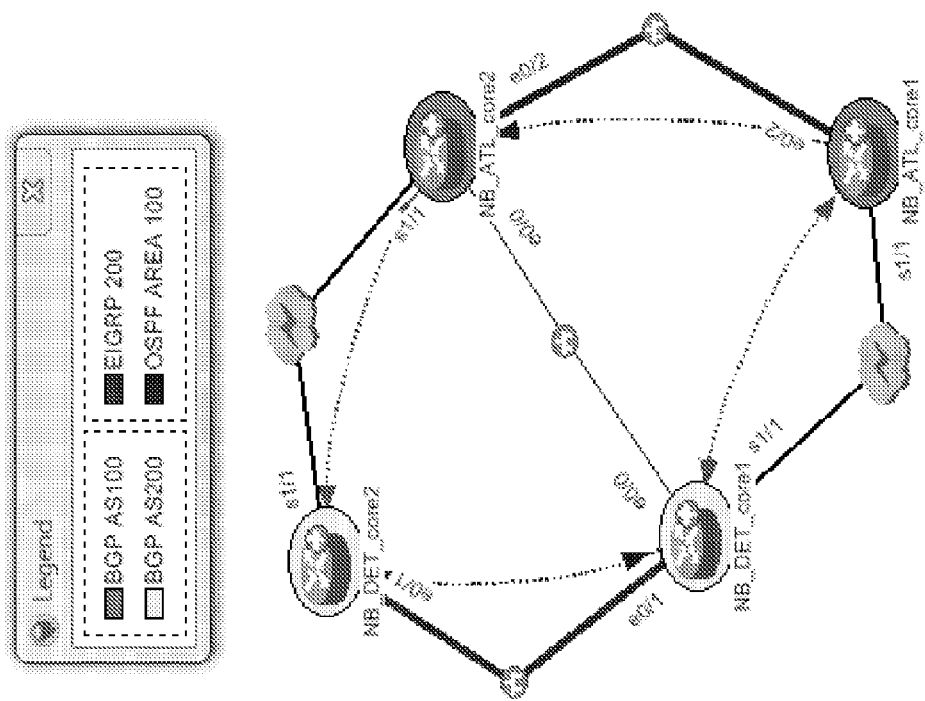
FIG. 13 shows a sample screen including the results of highlighting the routing protocol, in accordance with an exemplary embodiment of the present invention.

FIG. 12 shows a sample floating bar of the type displayed when the user clicks the blank space of a Q-map, in accordance with an exemplary embodiment of the present invention. Here, the tasks of this menu will be applied to the Q-map or all network objects in the Q-map. The menu bar includes the following submenus:

Highlight: highlight the routing protocol, multicasting mode, or MPLS VPN Routing and Forwarding (VRF) configuration. FIG. 13 shows a sample screen including the results of highlighting the routing protocol, in accordance with an exemplary embodiment of the present invention. The interface is displayed in colors according to the routing protocol it is configured to run.

Figures 14A, 14B:
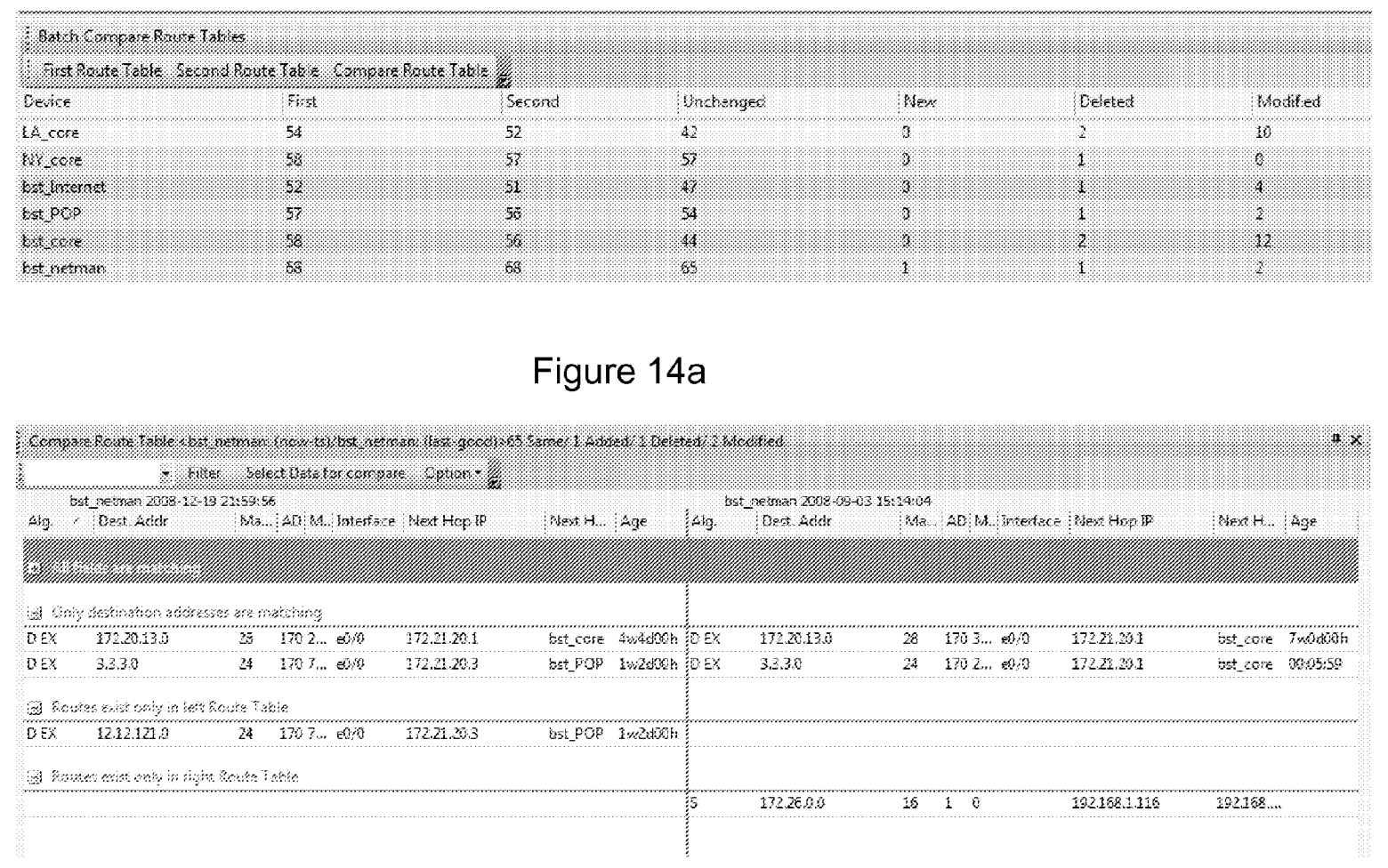

Analyze. The "Compare Config & Routing" function allows the user to select two cached data sets and compare configurations and routing tables in these two cached data set for all network devices in the map. The result is displayed in the easily read and sorted format. FIG. 14*a* shows a sample routing table comparison result, in accordance with an exemplary embodiment of the present invention. The table summarizes how many routes are unchanged, modified, added or deleted between two cached data sets. The table can be sorted by any of the fields so that the user can easily know, for example, the device with the most modified routes. The user can click one entry to view the detail for one network device. FIG. 14*b* shows the routing table comparison result for one device, in accordance with an exemplary embodiment of the present invention. The data are divided into four categories: unchanged routes, modified routes, new routes and deleted routes.

Figure 15:
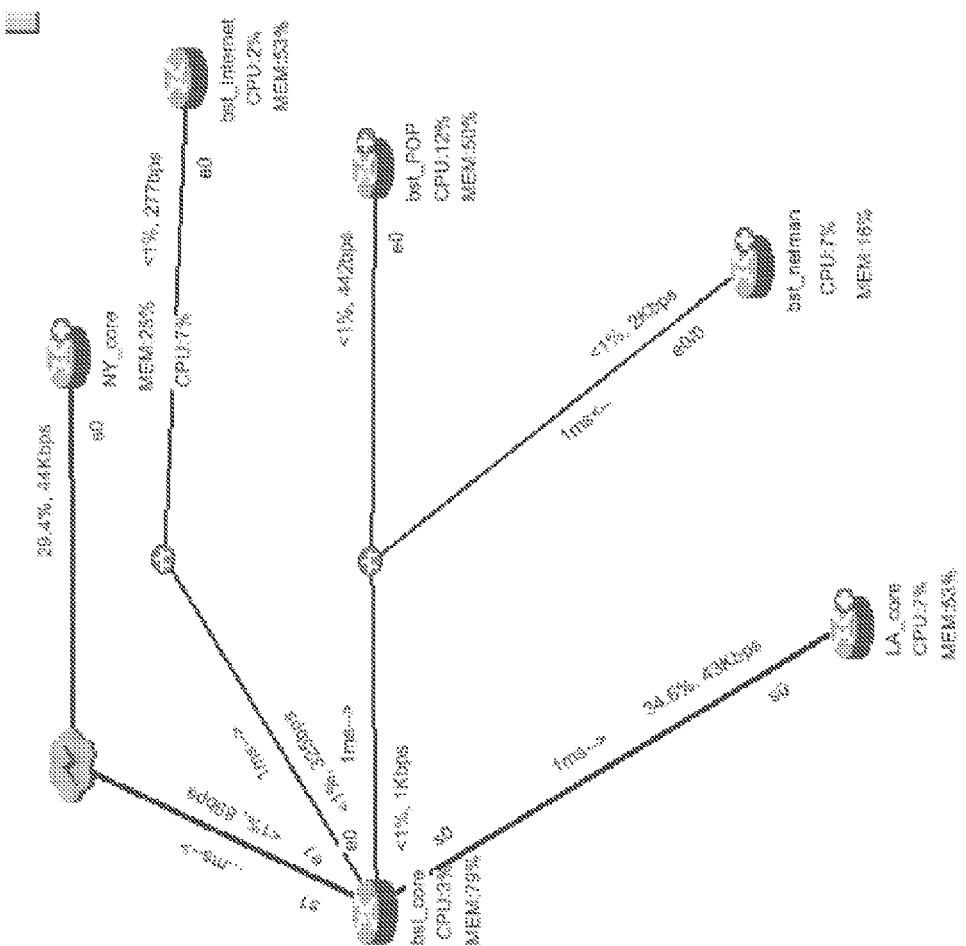
FIG. 15 shows a sample Q-map which is being monitored, in accordance with an exemplary embodiment of the present invention.

Monitor. Monitoring based on Q-map is different from a traditional 24×7 monitoring tool. It can be started and stopped with one click from a Q-map and the result is instantly visualized in the Q-map. FIG. 15 shows a sample Q-map which is being monitored, in accordance with an exemplary embodiment of the present invention. By default, the system monitors such things as the availability, CPU utilization, memory utilization for all devices in the Q-map and status, inbound/outbound bandwidth usage and delay for all interfaces in the Q-map. All of these data are visible and updated in the Q-map so that the user can immediately see what is going on in the network.

Figure 16:
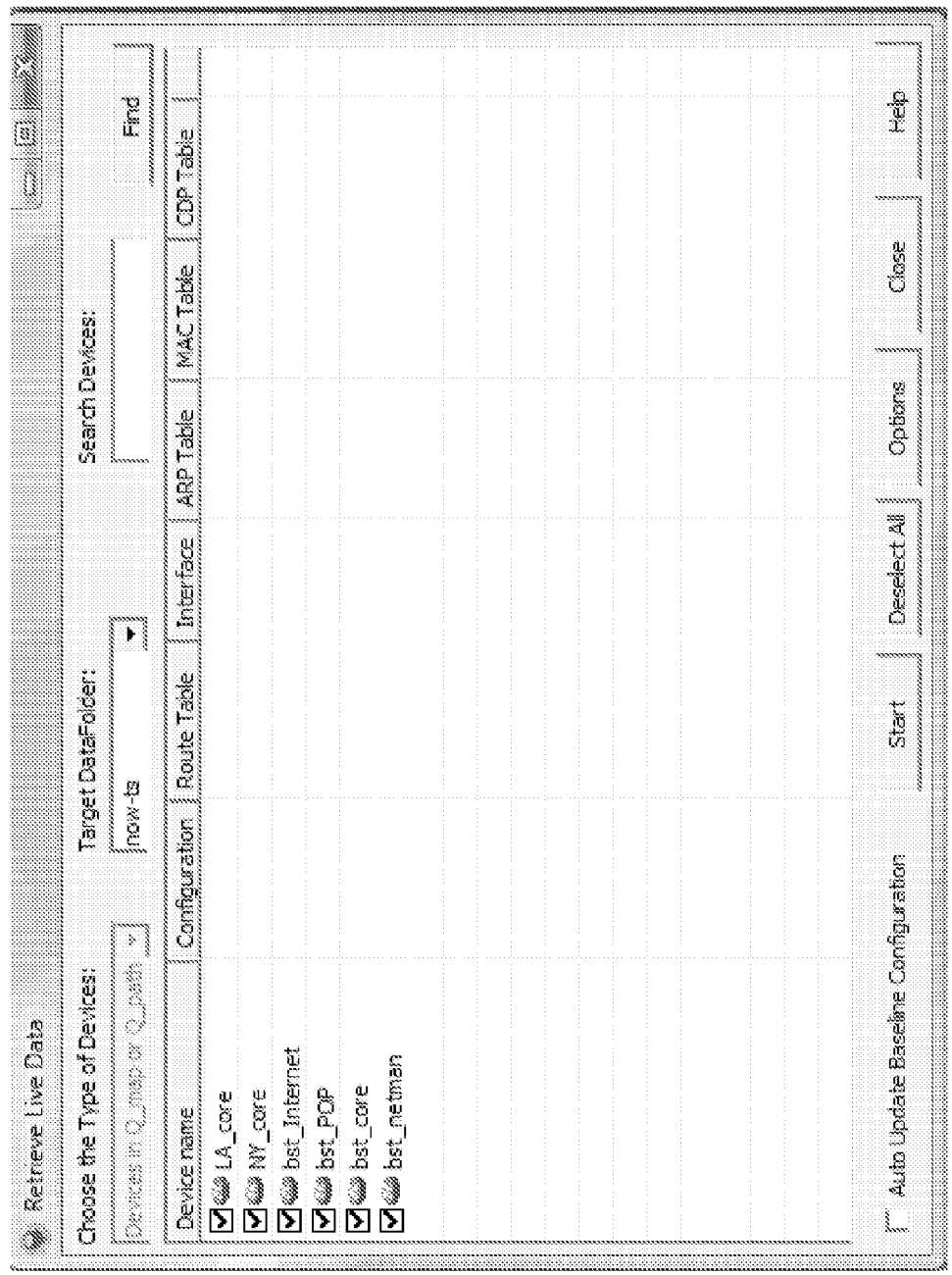
FIG. 16 shows a sample user interface to benchmark the network data for a Q-map, in accordance with an exemplary embodiment of the present invention.

Benchmark. The benchmark function allows the user to retrieve the live data for all devices in a Q-amp by one click. The data retrieved while the network is operating normally can be used in the future troubleshooting process. The user can compare two benchmarks, for example, comparing a benchmark of the network in a "troubled" state with a prior benchmark while the network was in a "good" state to identify potential problems or comparing benchmarks from before and after a network configuration change to verify the change. The benchmark function is specifically useful for the network design process. When a network design is implemented, the network data should be benchmarked before and after the change. The user then compares these two data sets to see the results of the change. FIG. 16 shows a sample user interface to benchmark the network data for a Q-map, in accordance with an exemplary embodiment of the present invention. By default, all devices in the Q-map are automatically selected in an exemplary embodiment. By default, the system will retrieve configuration files, route tables, interface information, Address Resolution Protocol (ARP) tables, Medium Access Control (MAC) tables, and Cisco Discovery Protocol (CDP) tables. After the data is retrieved, the data is stored in the database or the file system so that it can be systematically managed.

Network documentation. This feature automatically collects all or subsets of network data for all devices on Q-maps and creates a word processor document, e.g., in Microsoft Word format. The CANE system divides the network data into blocks according to the knowledge domain or data type. A network document may include the following blocks of network data:

Map: maps, map notes and Visio views of maps.

Device Info: management IP and interface, etc.

L3 Interface Info: primary IP address, routing protocol, description, etc.

L2 Interface Info: L2 neighbor, mode, duplex, speed, etc.

Device Configuration.

Routing Design: IGP, BGP, Static routing design and highlight routing protocol on map.

L2 Topology: connectivity of all devices in map, connections between end systems and switch ports.

Network Change: summary report of configuration comparing, routing table comparing, route propagation comparing.

Traffic Path: show each hop of traffic path.

The system allows the user to customize what types and subtypes of data should be collected and included in the document using templates. The system also provides templates for three standard engineering processes:

Troubleshooting: used to document the network troubleshooting process.

Network Design: used to document your network design and/or implementation work.

Network Inventory: used o document the network discovery or network assessment result.

The user can also define a Network Document Template.

Figure 17:
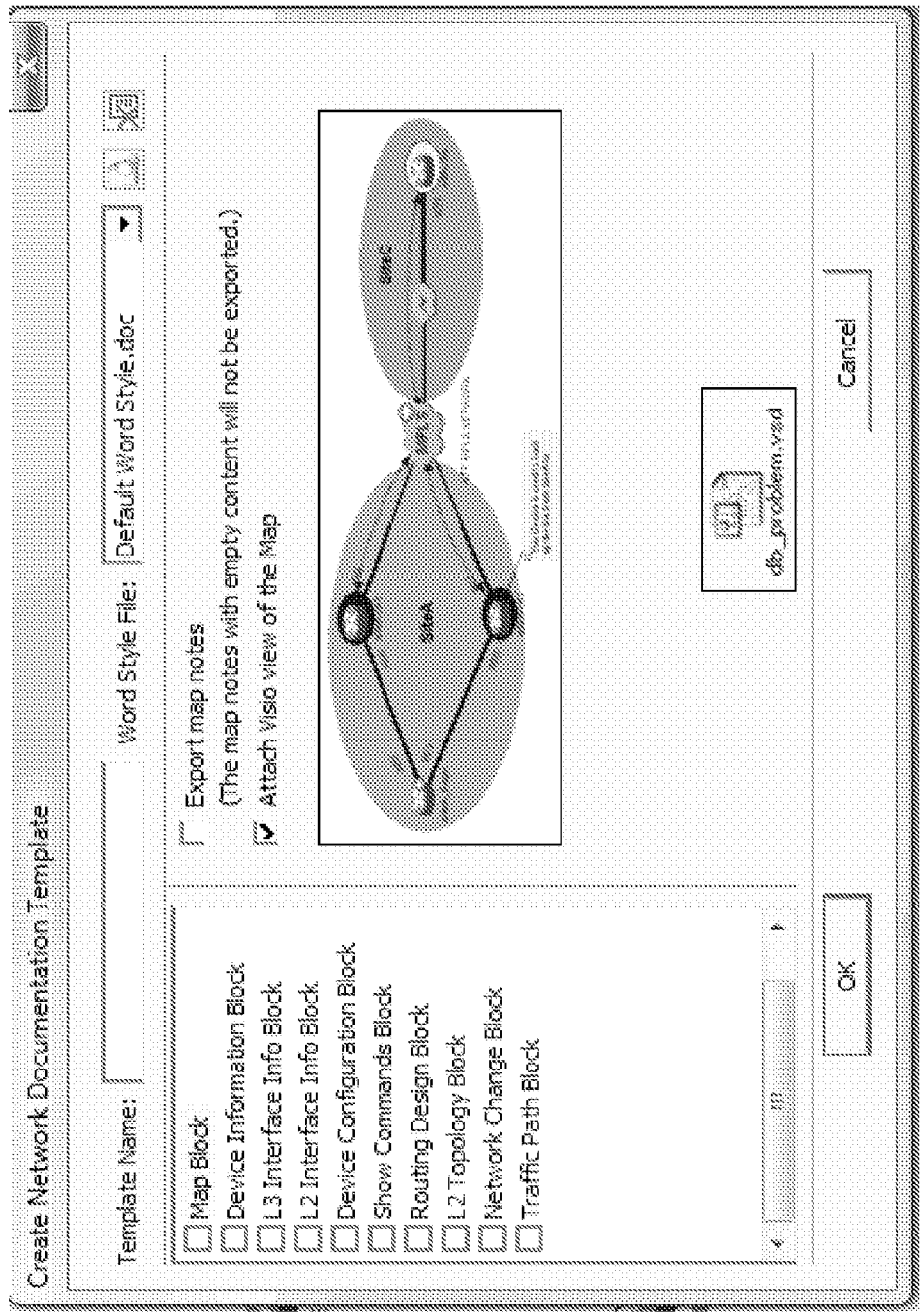
FIG. 17 shows a sample interface to define a network documentation template, in accordance with an exemplary embodiment of the present invention.

FIG. 17 shows a sample interface to define a network documentation template, in accordance with an exemplary embodiment of the present invention. In the left pane, the user can select which block(s) of data to include in the output document, and in the right pane, the user can choose which subset of data to output.

Export to Visio. This function allows the user to convert a Q-map into Visio by one click. The system automatically invokes the Microsoft Visio application and creates a Visio map identical to Q-map. This is useful for the user to share his work with other people who do install our system.

Figure 18:
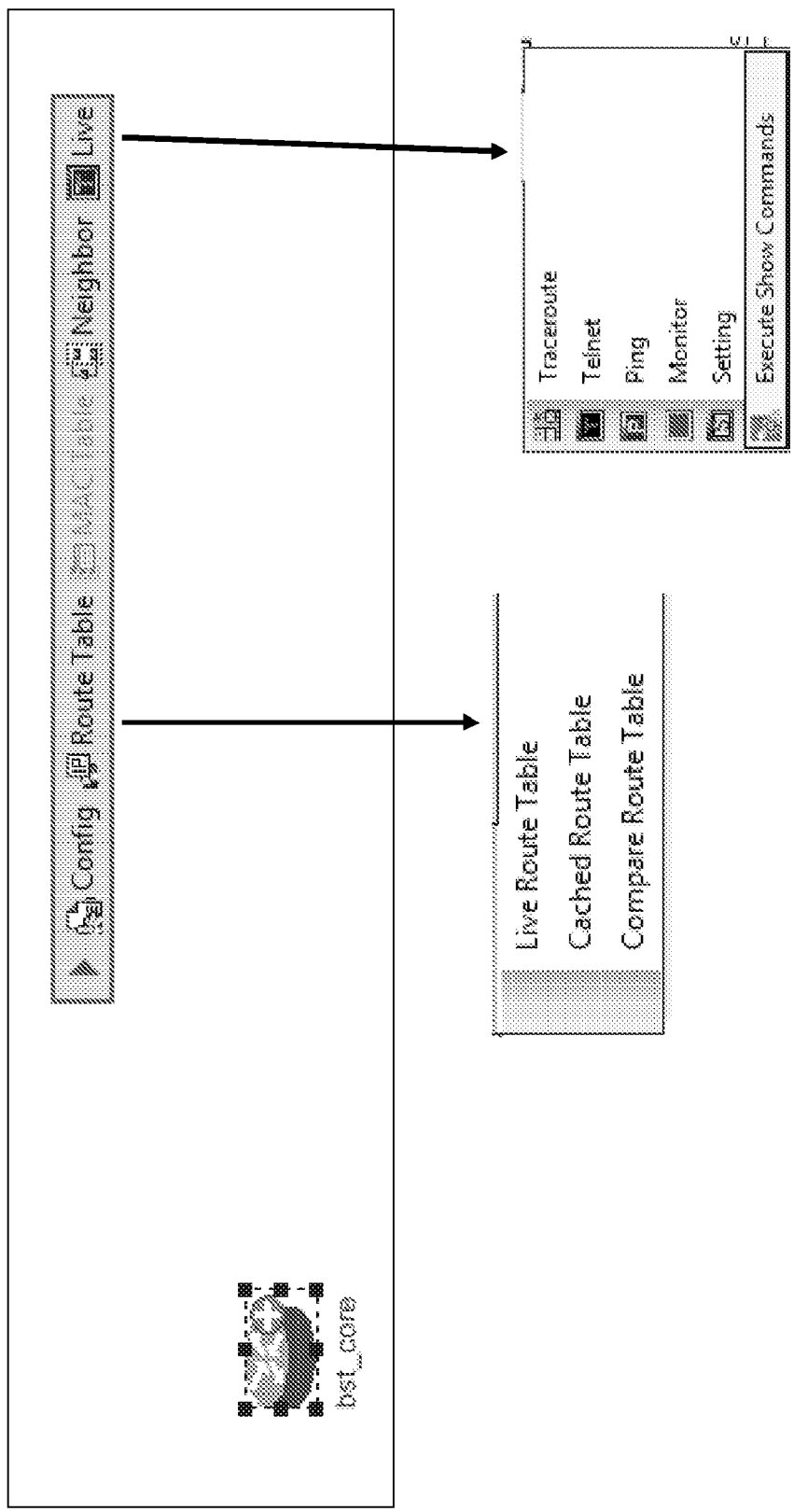
FIG. 18 shows a sample floating bar when the user clicks a router of a Q-map, in accordance with an exemplary embodiment of the present invention.

FIG. 18 shows a sample floating bar when the user clicks a router of a Q-map, in accordance with an exemplary embodiment of the present invention. Here, the tasks of this menu will be applied to this router. The menu bar includes the following submenus:

Configuration: displays the configuration for this router.

Route table: retrieve and display the routing table from the live network; display the cached routed table; and compare the routing tables.

.MAC table: displays the MAC table for L2 devices; here, it is grayed out since this menu only applies to the L2 device, not a L3 device such as the router.

Neighbor: extend the device neighbor for this router.

Live: provides the functions to access this device, such as pint, telnet/SSH, trace route and monitor.

Figure 19:
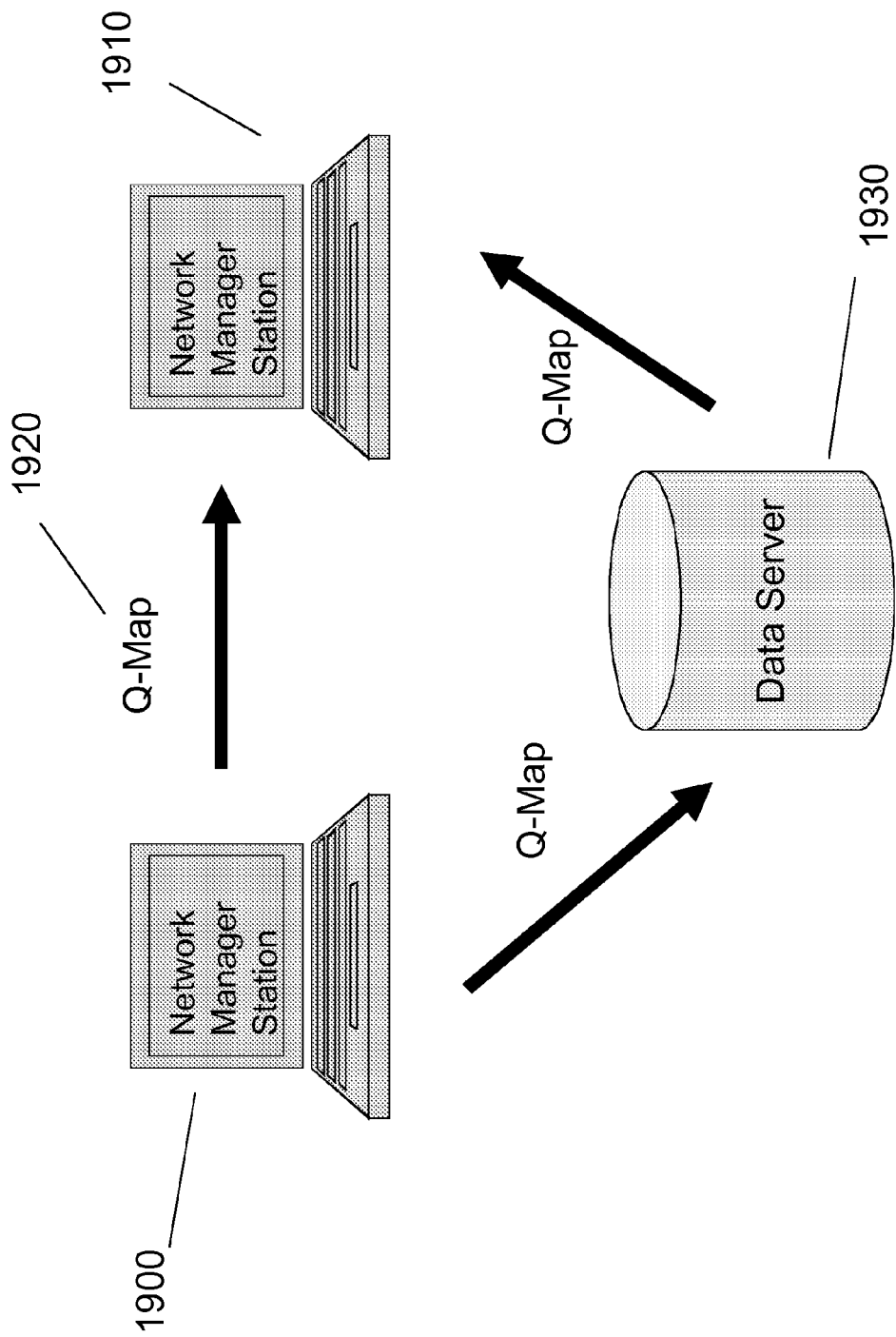
FIG. 19 is a schematic diagram illustrating Q-map sharing between network management systems, in accordance with an exemplary embodiment of the present invention.

FIG. 19 is a schematic diagram illustrating Q-map sharing between network management systems, in accordance with an exemplary embodiment of the present invention. Such sharing can be used for network managers to exchange network knowledge or share work. Since a Q-map contains full knowledge of all network objects shown in the map, Q-map is self contained and does not depend on other data, and therefore network manager station 1900 in FIG. 19 can send Q-map 1920 to station 1910 and station 1910 can open and navigate Q-map 1920 and use it as the visual operation system for network management tasks. Additionally or alternatively, Q-maps may be shared through a central data server 1930.

In exemplary embodiments of the present invention, network device configuration information can be collected at the request of the user or automatically based on a configured time interval or otherwise. For example, the network professional may choose to have network device configuration information collected and stored periodically, e.g., for benchmarking or otherwise.

One exemplary embodiment of the present invention is the NetBrain Workstation™ Edition 2.3.J network management product sold by NetBrain Technologies Inc. of Burlington, Mass. This product is described generally in the associated user documentation available via the web at http://www.netbraintech.com/ftp/Manuals/NetbrainMEV23j.rar; this user documentation is hereby incorporated herein by reference in its entirety for all purposes. Appendix A is a copy of section 3 of the above-referenced user documentation and describes operations including importing configuration files, creating a Q-map, viewing a Q-map, and customizing a Q-map. Appendix B is a copy of section 4 of the above-referenced user documentation and describes the NetBrain Workstation™ workspace and operations including adding devices to a workspace, removing devices from a workspace, rebuilding a workspace, resetting a workspace, the workspace interface, and searching. Appendix C is a copy of section 5 of the above-referenced user documentation and describes management of NetBrain objects/elements including understanding devices, unclassified devices, end systems (including adding an end system, batch importing end systems, batch exporting end systems, working on end systems), MPLS clouds, WAN clouds, and device groups (including defining device groups, managing device groups, working on device groups, batch exporting device groups, and batch importing device groups). Appendix D is a copy of section 6 of the above-referenced user documentation and describes Q-maps including creating Q-maps (including drag and drop configuration files to a map, creating a map via search result, creating a map via extending neighbors, mapping a device group, mapping a traceroute result, mapping a shortest path), working on Q-maps (including zoom in and zoom out to browse a map, Q-map floating menus, highlighting maps, configuration tips, using device notes, exporting a map to Visio, auto link, auto layout, drawing a Q-map manually, viewing the properties of an object, and sending a Q-map), and managing configuration files in a Q-map (including configuration files in a Q-map and validating a map). Appendix E is a copy of section 8 of the above-referenced user documentation and describes an IP Detector operation. Appendix F is a copy of section 9 of the above-referenced user documentation and describes various workspace tools including ping, traceroute, Telnet/SSH, external tools, and map options. Appendices A-F are expressly incorporated herein physically and by reference for all purposes.

It should be noted that terms such as "client," "server," "switch," and "router" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computerized method of modeling a communication network having a plurality of network devices, the method comprising:

in a first computer process, generating an interactive map file specifying a plurality of network elements associated with the plurality of network devices and including configuration information obtained from each of the plurality of network devices via a network interface, the configuration information logically divided into a plurality of data layers;

in a second computer process, mapping each data layer to one of a plurality of display resolutions, wherein the mapping specifies a minimum display resolution for each of the data layers;

in a third computer process, receiving, via a graphical user interface, first user input specifying a first display resolution;

in a fourth computer process, selecting, based on the first display resolution and the mapping, a first set of network elements and a first set of configuration information from the interactive network map file, wherein the first set of configuration information includes only configuration information associated with one or more data layers having a minimum display resolution less than or equal to the first display resolution; and in a fifth computer process, providing, via the graphical user interface, a first screen including the first set of network elements and the first set of configuration information for display on a user terminal.

2. A method according to claim 1, further comprising:
obtaining the configuration information from the plurality of network devices by transmitting command line interface (CLI) commands to the network devices.

3. A method according to claim 1, wherein generating the interactive map file comprises:
specifying at least one network element for each network device; and
specifying at least one network element for a physical or logical interconnection between network devices.

4. A method according to claim 1, wherein mapping each data layer to one of a plurality of display resolutions comprises:
configuring a display resolution for each data layer.

5. A method according to claim 1, wherein the mapping is included in the interactive map file.

6. A method according to claim 1, wherein the mapping is maintained by the user terminal.

7. A method according to claim 1, further comprising:
receiving, via the graphical user interface, second user input specifying a second display resolution;
selecting, based on the second display resolution and the mapping, a second set of network elements and a second set of configuration information from the interactive network map file, wherein the second set of configuration information includes only configuration information associated with one or more data layers having a minimum display resolution less than or equal to the second display resolution; and
providing, via the graphical user interface, a second screen including the second set of network elements and the second set of configuration information for display on the user terminal.

8. A method according to claim 7, wherein the second user input includes a zoom selection.

9. A method according to claim 8, wherein the zoom selection includes one of:
manipulation of a tracking device, optionally while a predetermined key is pressed;
dragging of a slide bar control;
selection of a zoom up or down control;
a zoom value selected from a menu of zoom selections; and
a zoom value entered into a zoom field.

10. A method according to claim 8, wherein the first screen includes a zoom control and wherein the second user input is made using the zoom control.

11. A method according to claim 1, further comprising:
modifying the mapping; and
selecting, based on the first display resolution and the modified mapping, a second set of network elements and a second set of configuration information from the interactive network map file; and
providing, via the graphical user interface, a second screen including the second set of network elements and the second set of configuration information for display on the user terminal.

12. A method according to claim 1, wherein the interactive network map file is a layer 3 interactive network map file.

13. A method according to claim 1, wherein the interactive network map file is a layer 2 interactive network map file.

14. A method of displaying an interactive network map, the method comprising:
receiving an interactive map file specifying a plurality of network elements and including associated configuration information, the configuration information logically divided into a plurality of data layers;
maintaining, in a storage device, a mapping that associates each data layer with one of a plurality of display resolutions, wherein the mapping specifies a minimum display resolution for each of the data layers;
receiving, via a graphical user interface, first user input specifying a first display resolution;
selecting, based on the first display resolution and the mapping, a first set of network elements and a first set of configuration information from the interactive network map file, wherein the first set of configuration information includes only configuration information associated with one or more data layers having a minimum display resolution less than or equal to the first display resolution; and
providing, via the graphical user interface, the first set of network elements and the first set of configuration information for display on a display device.

15. A computer aided network engineering system that displays interactive network maps using network device configuration information obtained from a plurality of network devices, wherein in the network device configuration information is logically divided into a plurality of data layers, the system comprising: a graphical user interface; and a network manager configured to present, via the graphical user interface, interactive network maps at user-selectable display resolutions, wherein at each user-selectable display resolution, the network manager presents network device configuration information for selected devices based on a mapping that specifies a minimum display resolution for each of the data layers, wherein the presented network device configuration information includes only configuration information associated with one or more data layers having a minimum display resolution less than or equal to a user-selected display resolution.

* * * * *

UNITED STATES PATENT AND TRADEMARK OFFICE
CERTIFICATE OF CORRECTION

PATENT NO. : 8,386,593 B1
APPLICATION NO. : 12/505432
DATED : February 26, 2013
INVENTOR(S) : Lingping Gao et al.

Page 1 of 1

It is certified that error appears in the above-identified patent and that said Letters Patent is hereby corrected as shown below:

In the Claims:

In Column 22, Line 31:

Replace "devices, wherein in the network device configuration"

With "devices, wherein the network device configuration"

Signed and Sealed this
Twenty-eighth Day of May, 2013

Teresa Stanek Rea
*Acting Director of the United States Patent and Trademark Office*